US008590920B2

(12) United States Patent
Masaki

(10) Patent No.: US 8,590,920 B2
(45) Date of Patent: Nov. 26, 2013

(54) FOLDING WHEEL CHAIR AND STAND-ASSIST SEAT

(76) Inventor: Sadao Masaki, Chiba (JP)

( * ) Notice: Subject to any disclaimer, the term of this patent is extended or adjusted under 35 U.S.C. 154(b) by 148 days.

(21) Appl. No.: 13/177,851

(22) Filed: Jul. 7, 2011

(65) Prior Publication Data

US 2012/0007341 A1 Jan. 12, 2012

(30) Foreign Application Priority Data

Jul. 9, 2010 (JP) ................................ 2010-156438

(51) Int. Cl.
*B62B 1/00* (2006.01)

(52) U.S. Cl.
USPC .......................................... 280/650; 297/337

(58) Field of Classification Search
USPC ................ 280/642–643, 647, 649, 650, 638, 280/87.05; 297/DIG. 4, 3, 16.1–16.2, 297/354.12, 94, 35, 45
See application file for complete search history.

(56) References Cited

U.S. PATENT DOCUMENTS 4,026,568 A * 5/1977 Hallam .......................... 280/42
5,076,390 A * 12/1991 Haskins .................... 280/250.1
5,513,867 A * 5/1996 Bloswick et al. .......... 280/250.1

FOREIGN PATENT DOCUMENTS

JP H10-179644 A 7/1998
JP 2008-237470 A 10/2008

* cited by examiner

*Primary Examiner* — J. Allen Shriver, II
*Assistant Examiner* — James Triggs
(74) *Attorney, Agent, or Firm* — Chen Yoshimura LLP

(57) ABSTRACT

A folding wheel chair having a pair of side frames 11 and 12, cross links 13 connecting said side frames each other, and a foldable seat 20 connected to the upper end of the cross links is provided. The seat 20 consists of a front right section 21, a front left section 22, a rear right section 23 and a rear left section 24. The front right and left sections are connected swingably to front edges of said rear right and left sections via a transverse axis X1 at the rear edges, and are connected swingably to the front portions of said cross links respectively via a transverse axis X2, the front right and rear right sections are connected swingably to the right edges of said front left and rear left sections via a longitudinal axis Y1 at the left edges, the rear right and left sections are connected to the cross links via a spring member 30.

20 Claims, 21 Drawing Sheets

FOLDING WHEEL CHAIR AND STAND-ASSIST SEAT

BACKGROUND OF THE INVENTION

Field of the Invention

The present invention relates to a folding wheel chair for assisting the user's actions of rising from or sitting on the folding wheel chair and a stand-assist seat for the folding wheel chair.

Conventionally, for assisting behaviors of old persons, physically handicapped persons, etc., wheel chairs are commonly used.

Such wheel chairs can be moved in any desired directions while the users are sitting on the seat of the wheel chairs by operation of the users or carers.

By the way, when an old person, or a physically handicapped person, etc. rises from or sits on a wheel chair or another-typed chair, in a middle position between a sitting posture and a standing-up posture, he must support his weight in the middle position with the strength of his legs.

However, when the strength of his legs are is not enough, he cannot support his own weight with his legs in such a middle position.

In this case, generally, it is necessary for a user to be supported by a carer.

In JP H10-179644 A1, a stand-assist chair is disclosed, which is characterized in that a seat is separated into a front seat section with a short depth and a rear seat section with a longer depth; whereby the front lower end of the rear seat section and the rear end of the front seat section are connected with a hinge; the front lower end of the rear seat section and the legs are connected by a front link, and the rear under end of the rear seat section and the legs are connected by the rear link, so that a parallel motion mechanism is constructed, and that the longitudinal middle portion of the rear seat section and the rear lower portion of the legs are connected with a gas-spring, whereby in an expansion state of the gas-spring, the rear seat section is raised up substantially parallel to the legs, and the front portion of the front seat section hangs forward by its own weight.

In JP 2008-237470 A1, a stand-assist device for a folding wheel chair is disclosed, of which the arm rest and the seat surface of the folding wheel chair are covered by cloth, etc., whereby in both sides of the seat surface respectively a frame is mounted to the cloth, etc., a rope connected to the frames is pulled or loosed by a drive mounted in the back of the wheel chair so that the frames are raised up or lowered.

SUMMARY OF THE INVENTION

In the stand-assist chair of JP H10-179644 A1, when the rear seat section is raised, the front seat section is inclined forward so that the user can rise from or can sit on the stand-assist chair smoothly.

However, since the front seat section and the rear seat section are integrated traverse in the stand-assist chair, the seat cannot be folded in the reverse-V state along the longitudinal center line. Therefore, it is difficult to apply the stand-assist chair to a folding wheel chair.

In the stand-assist device for a folding wheel chair of JP 2008-237470 A1, the whole seat is inclined forward and simultaneously raised up so that the user can rise from or can sit on the wheel chair easily.

However, if the user's legs are not strong enough, the user may slide down on the surface of the seat, or, in extreme cases, the body of the user may be thrown out forward because of the forward inclining of the seat. Therefore, when rising from the folding wheel chair, a carer must support the body of the user. So it cannot achieve the purpose to reduce a labor of the carer.

Furthermore, for raising or lowering the seat, the drive for winding the rope is necessary. In general, this drive is driven electrically or manually. When the drive is driven electrically, the folding wheel chair would be heavier and not easy to handle. When the drive is driven manually, the carer has to handle the drive manually in addition to assisting the standing-up or sitting action of the user.

In consideration of the above, it is an object of the present invention to provide a folding wheel chair and a stand-assist seat for assisting the user's actions of rising from or sitting on the folding wheel chair safely, in particular for an old user, a physically handicapped user, etc.

According to the first construction of the invention, the above object can be achieved by a folding wheel chair having a pair of side frames with a pair of wheels, a pair of cross links connecting said side frames each other, and a seat which is foldable by changing the distance between the both side frames, comprising: said seat consisting of a front right section, a front left section, a rear right section and a rear left section, whereby said front right and left sections are connected swingably to front edges of said rear right and left sections respectively via the first transverse axis at the rear edges, and are connected swingably to the front portions of said cross links respectively via the second transverse axis, said front right and rear right sections are connected swingably to the right edges of said front left and rear left sections respectively via the first longitudinal axis at the left edges, said rear right and left sections are connected to said cross links respectively via an elastic member, said seat takes the substantially horizontal seating state when the load to said seat is greater than the repellent force of the elastic member, said seat is brought in the stand-up state when said rear right and left sections are lifted up and said front right and left sections are inclined forward when the load to said seat is less than the repellent force of said elastic member.

In the folding wheel chair according to the invention, preferably said front right and left sections can swing to said rear right and left sections via said first traverse axis in a range between the same flat state and the reverse-V folded state, and said front right and rear right sections can swing to said front left and rear left sections via said first longitudinal axis in the range between the same flat state and the reverse-V folded state.

In the folding wheel chair according to the invention, preferably the rear right portion of said rear right section and the rear left portion of said rear left section are connected respectively to the respective ends of right and left link rods via the third traverse axis, and the other ends of said right and left link rods are connected respectively to said cross links via the fourth traverse axis.

In the folding wheel chair according to the invention, preferably the longitudinal lengths of said right and left link rods are equal to the same of said front right and left sections, and said rear right and left sections are substantially horizontal in the stand-up state.

In the folding wheel chair according to the invention, preferably the another ends of said right and left link rods are connected respectively to said cross links via the second and third longitudinal axes.

In the folding wheel chair according to the invention, preferably the right end of said rear right section and the left end of said rear left section are connected respectively to said cross links via said second and third longitudinal axes.

In the folding wheel chair according to the invention, preferably the lower end of said elastic member is connected to the crossing point of said cross links via the fifth traverse axis.

In the folding wheel chair according to the invention, preferably said rear right and left sections are connected respectively to the upper end of said elastic member via a linkage, whereby the distance between the upper end of said elastic member and the crossing point is substantially constant.

In the folding wheel chair according to the invention, preferably said linkage have right and left link members, which are connected to each other at the lower ends via said fourth longitudinal axis, and connected respectively to said rear right and left sections at the upper ends.

In the folding wheel chair according to the invention, preferably said fifth and sixth longitudinal axes are arranged at medium level between said first and fourth longitudinal axes in the folded state.

In the folding wheel chair according to the invention, preferably the lengths of said right and left link members are substantially half of the length which is obtained by subtracting the length between said fourth longitudinal axis and the crossing point of said cross links from the sum of the lengths between the first longitudinal axis and the second and third longitudinal axes and the length between the crossing point of said cross links and the second and third longitudinal axes.

In the folding wheel chair according to the invention, preferably the lower end of said elastic member is connected to the crossing point of said cross links via a mounting member, which has a vertical slot, in which the lower end of said elastic member is mounted.

In the folding wheel chair according to the invention, preferably said elastic member is a compression spring and, the repellent force of said compression spring is set as said seat comes down by user's weight.

Here, the compression spring is a member with an elasticity producing a repellent force corresponding to a force in a compressed direction, and includes a gas dumper, a coil spring, etc. and so not limited in a material.

In the folding wheel chair according to the invention, preferably said elastic member has a guide member, which is arranged parallel to an expansion direction of said compression spring and guides an elastic deformation of said compression spring.

In the folding wheel chair according to the invention, preferably said guide member has a regulating member, whereby the repellent force of said compression spring can be regulated by adjusting the axial position of said regulating member on said guide member.

In the folding wheel chair according to the invention, preferably a wheel brake is provided, which operates to brake the wheels in accordance with the action of said seat to the stand-up state.

In the folding wheel chair according to the invention, preferably said wheel brake is connected to said elastic member via a transfer mechanism and operated in accordance with the stretch of said elastic member.

In the folding wheel chair according to the invention, preferably said wheel brake is connected to said seat via a transfer mechanism and operated in accordance with the action of said seat to the stand-up state.

In the folding wheel chair according to the invention, preferably said wheel brake consists of a lock brake operated to lock the wheels in accordance with the action of said seat to the stand-upstate, and a band brake operated to lock the wheels when manually operated by a user or a carer.

According to a second construction of the invention, the above object can be achieved by a stand-assist seat mounted on a folding wheel chair having a pair of side frames with a pair of wheels, and a pair of cross links connecting said side frames each other, comprising: the seat consisting of a front right section, a front left section, a rear right section and a rear left section, whereby said front right and left sections are connected swingably to front edges of said rear right and left sections respectively via the first transverse axis at the rear edges, and are connected swingably to the front portions of said cross links respectively via the second transverse axes, said front right and rear right sections of said seat being connected swingably to the right edges of said front left and rear left sections respectively via the first longitudinal axis at the left edges, said rear right and left sections are connected to the cross links respectively via an elastic member, said seat takes the substantially horizontal seating state when a load to said seat is greater than the repellent force of the elastic member, said seat is brought in the stand-up state when said rear right and left sections are lifted up and said front right and left sections are inclined forward when the load to said seat is less than the repellent force of said elastic member.

According to the above mentioned construction of the folding wheel chair, if the load acted downwardly to said seat by the weight of the user becomes lower than the repellent force of the elastic member because the user raises his hip to stand up from the seating state with his legs or with a support of a carer, the rear right and left sections of the seat are lifted up by the elastic member, and simultaneously the front right and left sections of the seat are inclined forward, thereby the seat is brought to the stand-up state. Therefore, the hips of the user are supported and raised by the rear right and left sections, and the thighs of the user are supported by the front right and left sections. Consequently, the user can rise from the seat smoothly and easily even if his legs do not have enough strength.

In this case, the upward moving of the seat is carried out by the repellent force of the elastic member, so that a power supply for the drive is not necessary, thereby the seat and the whole wheel chair can be constructed compact and light.

While, in order to sit on the seat from the stand-up state, the user put his hips on the seat at the stand-up state contrary to rising from the seat. Then, the rear right and left sections of the seat is lowered by the body weight of the user counter to the repellent force of the elastic member, and simultaneously the front right and left sections of the seat is returned horizontal from the inclined state, so the whole seat become substantially horizontal. Thus, the hips of the user is lowered by being held by the rear right and left sections of the seat. At that time, the thighs of the user are held by the front right and left sections and the seat will not fall down to the seating state without stopping, so that the user can sit down on the seat slowly.

From the seating state without the user, the user or the carer raises up the traverse center area of the seat by hand, the seat will be folded in a reverse-V shape between the front right and rear right sections and the front left and rear left sections, that is, along the longitudinal center line.

In this case, since the rear right and left sections are connected to the upper end of the elastic member respectively via the linkages, and the upper end is substantially not moved to the cross point of the cross links, the swing actions of the rear right and left sections is not restricted by the elastic member when the rear right and left sections swing from the seating state to the folded state. Therefore, the folding action of the seat is carried out smoothly.

Thus, according to the present invention, by simple construction, a folding wheel chair and a stand-assist seat are provided for assisting the user's actions safely of rising from or sitting down the folding wheel chair, in particular, old users, physically handicapped users, etc.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

A preferred embodiment of the present invention is described in detail with reference to FIGS. 1 to 21.

It should be noted that, although technically preferable limitations are given in the embodiments described below because the embodiments are preferable specific examples of the invention, the scope of the invention is not limited to these embodiments unless otherwise noted.

Figure 1:
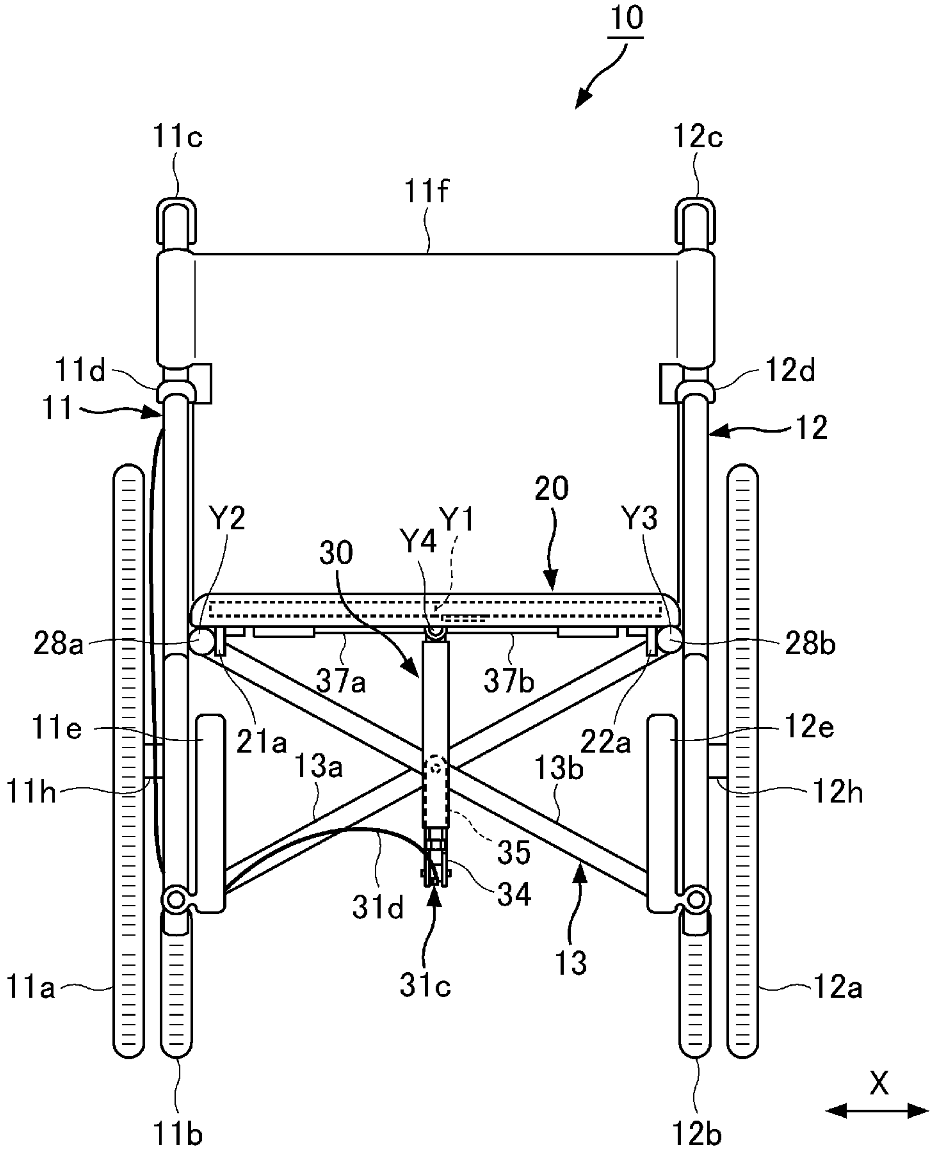
FIG. 1 is a schematic front view showing an embodiment of a folding wheel chair according to the present invention in the seating state.
Figure 2:
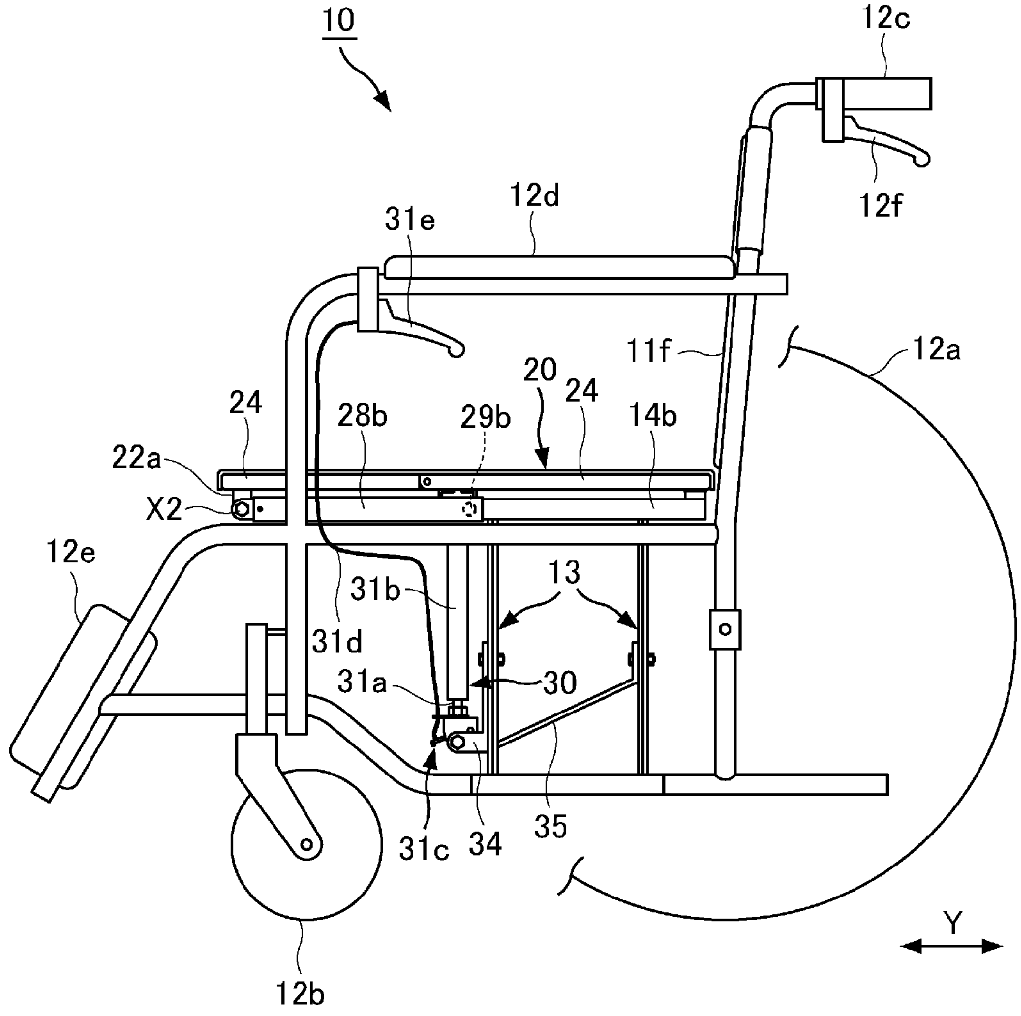
FIG. 2 is a schematic side view of the folding wheel chair shown in FIG. 1.

FIG. 1 and FIG. 2 show the construction of an embodiment of a folding wheel chair according to the present invention in the seating state. Here, when two parts have bilateral symmetry, only one part is described.

In FIG. 1 and FIG. 2, the folding wheel chair consists of a pair of side frames 11 and 12, cross links 13 which connect the pair of side frames 11 and 12 traverse (in x-direction), seat 20 which connects the upper portions of cross links 13 and spring member 30 (compression spring) which is biasing seat 20 upward.

Side frames 11 and 12 are constructed bilateral symmetry to each other. Side frames 11 and 12 are, as a conventional folding wheel chair, formed rectangular from material such as pipes etc. and respectively has wheels 11*a* and 12*a* with large diameter (rear wheels), casters 11*b* and 12*b* with small diameter, handles 11*c* and 12*c*, armrests 11*d* and 12*d*, and footrests 11*e* and 12*e*.

Furthermore, between the rear portions of side frames 11 and 12, folding seatback 11*f* made of e.g. cloth etc. is mounted.

Each cross link 13 consists of a pair of link members 13*a* and 13*b* crossing each other in X-form in front view. The lower ends of each link members 13*a* and 13*b* are connected respectively to the lower portion of right side frame 11 and left side frame 12. Here, as shown in FIG. 2, two cross links 13 are provided in front and rear.

Therefore, each of link members 13*a* and 13*b* of cross links 13 swings about the cross point of these cross members 13*a* and 13*b*, so that the x-directional distance of side frame 11 and 12 is variable.

Frame pipes 14*a* and 14*b* which connect seat 20 are fixed on the upper end of each link members 13*a* and 13*b* by welding etc. and are extending longitudinally.

Figure 3:
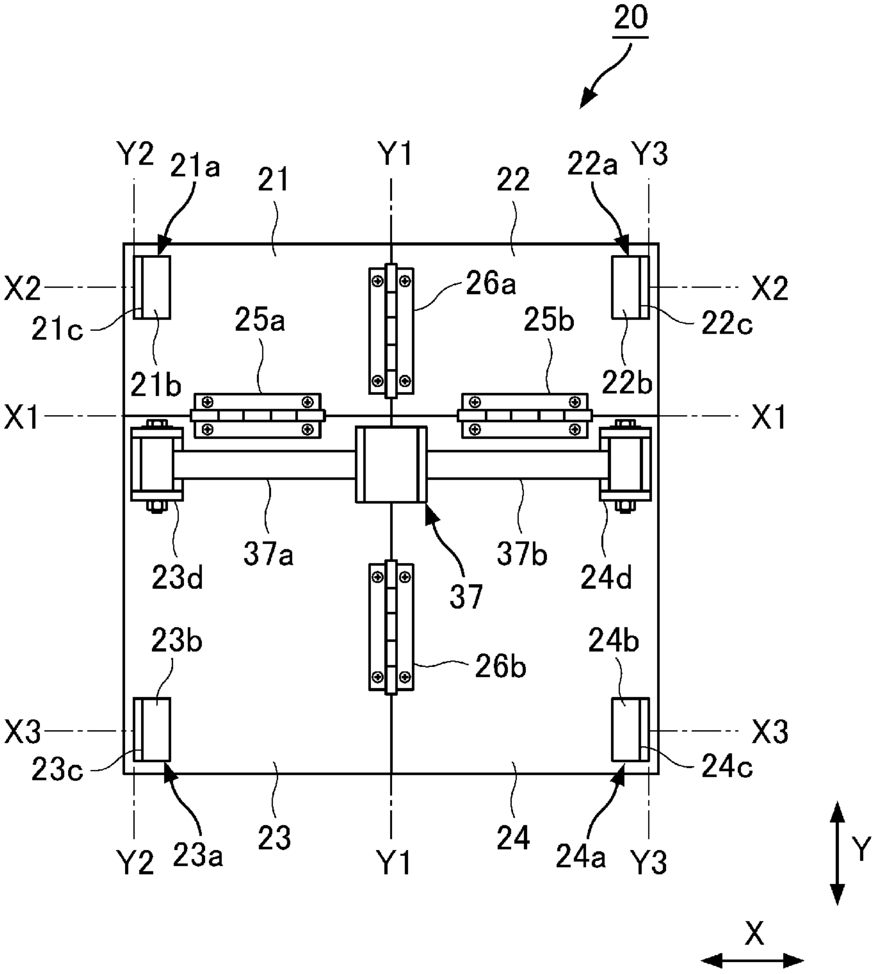
FIG. 3 is a schematic bottom view of the seat of the folding wheel chair of FIG. 1.

As shown in FIG. 3, seat 20 consists of four sections, i.e. front right section 21, front left section 22, rear right section 23 and rear left section 24, and these are separated along the x-direction and along the longitudinal direction (in y-direction).

Each of sections 21-24 is constructed from highly rigid material, e.g. plate of plastics, wood, metal, etc., and is provided with skin including cushion on the surface. The upper surface of seat 20 is formed concavely so as to fit to the shape of human's hip.

Here, front right and left sections 21 and 22 are connected respectively at rear ends to front edges of the rear right and left sections 23 and 24 swingably via the first traverse axis X1.

Specifically, in FIG. 3, front right and left sections 21 and 22 are connected respectively at rear ends to front edges of the rear right and left sections 23 and 24 via hinges 25*a* and 25*b*.

By this hinge construction, front right and left sections 21 and 22 can swing to rear right and left sections 23 and 24 via first traverse axis X1 in a range between the same flat state and the reverse-V folded state.

Furthermore, front right and left sections 21 and 22 are connected at the front portion to cross links 13 via second traverse axis X2.

Specifically, bearings 21*a* and 22*a* mounted on the front portion of front right and left sections 21 and 22 are connected swingably via axis X2 to the front areas of frame pipes 14*a* and 14*b*, i.e. to front ends of tubular rotating members 28*a* and 28*b*, which are put on the area forward the mount-positions of the front cross link. In more detail, each bearing 21*a* and 22*a* consists of base 21*b* and 22*b* and flange 21*c* and 22*c* which projected from the base, whereby a bolt of axis X2 is passed through a hole bored on flange 21*c* and 22*c*.

Front right section 21 and rear right section 23 are connected at the left edges to the right edges of front left section 22 and rear left section 24 swingably via second longitudinal (in Y-direction) axis Y1; specifically, as shown in FIG. 3, hinges 26*a* and 26*b*.

By this hinge construction, front right section 21 and rear right section 23 can swing to front left section 22 and rear left section 24 via first longitudinal axis Y1 in the range between the same flat state and the reverse-V folded state.

Furthermore, the rear right portion of rear right section 23 is connected to the rear end of right link rod 27*a* via third traverse axis X3. Similarly, the rear left portion of rear left section 24 is connected to the rear end of left link rod 27*b* via axis X3.

Specifically, the rear ends of the link rods 27*a* and 27*b* are connected to bearing 23*a* and 24*a*, which are arranged at the rear right portion of rear right section 23 and the rear left portion of rear left section 24, swingably around axis X3. In more detail, each bearing 23*a* and 24*a* consists of base 23*b* and 24*b* and a flange 23*c* and 24*c* projected from the base, whereby a bolt, namely axis X3, is passed through a hole bored in the flange 23*c* and 24*c*.

Here, As mentioned above, bearing 21*a* and 22*a* arranged at the front portions of front right and left sections 21 and 22 are mounted on the front ends of tubular rotating members 28*a* and 28*b*, while these rotating members 28*a* and 28*b* are rotatably put on the front areas of frame pipes 14*a* and 14*b*, i.e. the area in front of the mount-positions of the front cross link. In other words, bearing 21*a* and 22*a* are connected swingably to frame pipes 14*a* and 14*b* via the center lines of rotating members 28*a* and 28*b*, i.e. via second longitudinal axis Y2 and third longitudinal axis Y3.

As mentioned above, the rear right portion of rear right section 23 and the rear left portion of rear left section 24 are connected respectively to the rear ends of right link rod 27*a* and left link rod 27*b*, while the front ends of right and left link rods 27*a* and 27*b* are connected respectively to rotating members 28*a* and 28*b* as mentioned below.

Namely, bearing 23*a* and 24*a* arranged to rear right and left sections 23 and 24 are mounted swingably to frame pipes 14*a* are 14*b* respectively via second longitudinal axis Y2 and third longitudinal axis Y3.

Front ends of link rods 27*a* and 27*b* are connected to the upper portions of cross links 13 via fourth traverse axis X4.

Specifically, the front ends of link rods 27*a* and 27*b* are connected swingably around axis X4 by bearing 29*a* and 29*b* arranged at the front areas of frame pipes 14*a* and 14*b*, i.e. the tubular rotating members 28*a* and 28*b*, which are put on the area in front of the mount-positions of the front cross link.

The lengths of link rods 27*a* and 27*b* are set nearly equal to the y-directional length of front right and left sections 21 and 23. Thereby, in the below mentioned stand-up state, rear right and left sections 23 and 24 are substantially held horizontally.

Here, rotating members 28*a* and 28*b* can slide longitudinally along frame pipes 14*a* and 14*b*, and can rotate about the center axis thereof, by being fitted loosely on frame pipes 14*a* and 14*b*.

Rotating members 28*a* and 28*b* slide in the rotating directions about frame pipes 14*a* and 14*b*, and slide to some extent longitudinally. Thus, tolerances in dimension or assembling of link rods 27*a* and 27*b* and front right and left sections 21 and 22 and rear right and left sections 23 and 24 of seat 20 can be permitted.

Figure 4:
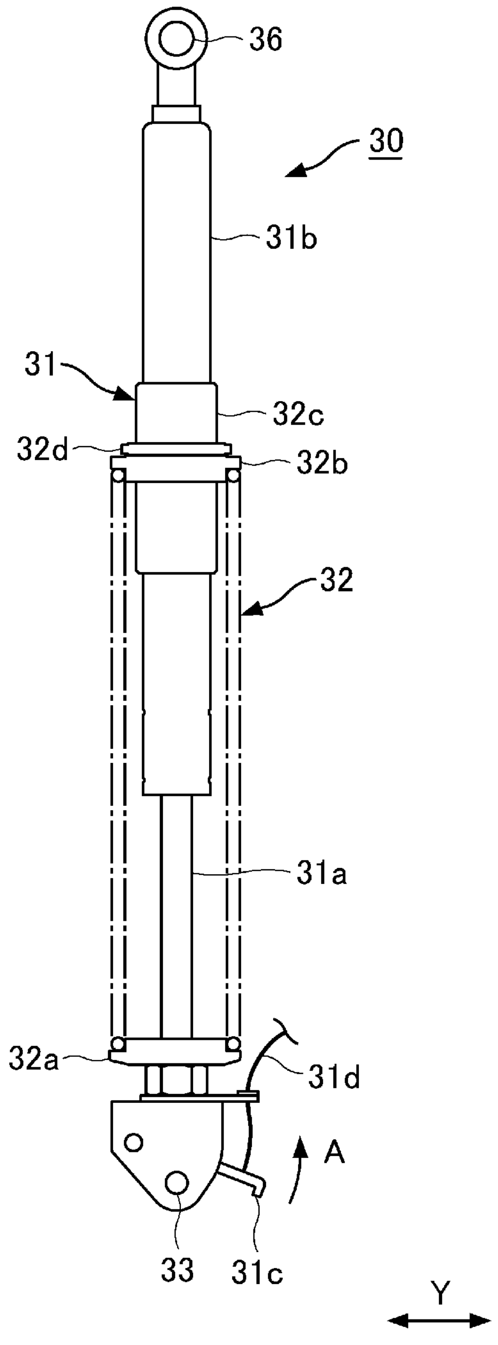
FIG. 4 is an enlarged side view showing the elastic member of the folding wheel chair of FIG. 1.

As shown in FIG. 4, spring member 30 consists of gas-spring 31 and coil spring 32.

Gas-spring 31 is a device with elasticity producing repellent force in compressing direction, and also a device which has functions as a compression spring and a guide member at the same time, because it is guided in expansion and compression direction by a cylinder and a piston arranged in the expansion and compression direction.

Gas-spring 31 is constructed in known way, for example, biased such that nitrogen gas is enclosed in the cylinder, whereby moving part 31*a* including the piston moves longitudinally to body part 31*b* including the cylinder, so that the entire gas-spring 31 expands and compresses. The repellent force of the gas-spring is set as seat 20 comes down by the user's weight against the repellent force of gas-spring 31 when a user sits down on seat 20.

Furthermore, gas-spring 31 has brake mechanism 31*c* at the lower end. Brake mechanism 31*c* is operated through wire 31*d*.

One end of wire 31*d* is connected to brake mechanism 31*c* and acts by drawing the inner wire of wire 31*d* in a direction of arrow A in FIG. 4. Brake mechanism 31*c* allows moving part 31*a* to move when operating, and prevents moving part 31*a* to move when not operating, irrespective of the position of moving part 31*c*.

Here, as shown in FIG. 2, the other end of wire 31*d* is connected to operating part 31*e* arranged close to arm rest 11*d* of right side frame 11 of folding wheel chair 10.

In the illustrated case, operating part 31*e* is constructed as a lever, whereby the lever release brake mechanism 31*c* by grasping and moving it toward arm rest 11*d* to draw the inner wire of the wire 31*d*. The braking strength of brake mechanism 31*c* is adjustable by the grasping strength of operating part 31*e*.

Wire 31*d* is constructed in known way, and consists of an inner wire inserted in a hollow outer wire, whereby both ends of the outer wire are secured to lower end 33 of gas-spring 31 and the fixing part of lever 31*e*, respectively. Therefore, operations of brake mechanism 31*c* are performed by operating lever 31*e* to push or to pull the inner wire longitudinally.

Lever 31*e* is provided with a lock mechanism (not shown), whereby lever 31*e* is locked in operating state, i.e. in the state of releasing brake mechanism 31*c*. A conventional lever-lock structure can be used to fix lever 31*e* in the grasped state.

Coil spring 32 is a compression coil spring, which is strained between moving part 31*a* and body part 31*b* of gas-spring 31, and reinforces the repellent force of gas-spring 31.

Specifically, the coil spring 32 is arranged between spring sheet 32*a* mounted on the moving part 31*a* and spring sheet 32*b* mounted on the body part 31*b*.

Here, spring sheet 32*b* on the side of body part 31*b* is adjustable longitudinally along the gas-spring 31, by rotating and adjusting lock nut 32*d* (a regulating member), which is screwed on screw sleeve 32*c* put in and fixed to body part 31*b*, to screw sleeve 32*c*.

Therefore, the length of coil spring 32 is adjusted and so the expanding force by a return force of gas-spring 31 is adjusted, whereby the repellent force of gas-spring 31 can be adjusted to be fit with the user's weight.

The lower end 33 of gas-spring 31 is mounted on the cross points of cross links 13 via mounting members 34 and 35, and connected to mounting members 34 and 35 swingably via fifth traverse axis X5.

Specifically, the lower end 33 of the gas-spring 31 is mounted to vertical slots (not shown) so that lower end 33 is adjustable in vertical position, whereby the slots are arranged at the respective ends of mounting member 34 and 35. Thus, lower end 33 of gas-spring 31 is connected integrally to the cross points of cross links 13.

Preferably, lower end 33 of gas-spring 31 is screwed by bolts, etc. through collars (not shown) inserted in slots (not shown) arranged at the lower ends of mounting members 34 and 35. Thereby, lower end 33 of the gas-spring 31 is connected to mounting members 34 and 35 having plays corresponding to the vertical length of the slots.

The upper ends of mounting member 34 and 35 are screwed, with connecting screws (not shown) to secure each of link members 13*a* and 13*b*, swingably each other on the cross point of cross members 13*a* and 13*b* of the cross links 13.

The upper end 36 of gas-spring member 31 is connected to rear right and left sections 23 and 24 of seat 20 via linkage 37.

Specifically, linkage 37 consists of right link member 37*a* and left link member 37*b*, whereby the middle side ends of each link members 37*a* and 37*b* are connected to upper end 36 of gas-spring 31 via fourth longitudinal axis Y4.

The other ends of the link members 37*a* and 37*b* are connected respectively to rear right and left section 23 and 24 via fifth longitudinal axis Y5 and sixth longitudinal axis Y6.

Specifically, the upper ends of link members 37*a* and 37*b* are connected to rear right and left section 23 and 24 swingably about axes Y5 and Y6, via bearing 23*d* arranged at the front right portion of rear right section 23 and bearing 24*d* arranged at the front left portion of rear left section 24, respectively.

Here, the length of link members 37*a* (37*b*) is substantially half of the length which is obtained by subtracting the length between the cross points of cross links 13 and the axis Y2 (Y3) from the sum of length between axis Y1 and the axis Y2 (Y3) and the length between the axis Y4 and the axis Y5 (Y6).

Thereby, rear right and left sections 23 and 24 and the right and left link members 37*a* and 37*b* construct a diamond link, whereby both in the folded state with raising the center of seat 20 and in the seating state, the length between the cross points of cross links 13 and axis Y4 is always constant. Therefore, folding wheel chair 10 can be folded or unfolded without expanding or compressing spring member 30.

The folding wheel chair according to the invention is constructed as mentioned above, and will be used as below mentioned.

At first, when using, as shown in FIG. 1 and FIG. 2, folding wheel chair 10 is set in the seating state, and cross links 13 are expanded in X direction, whereby both side frames 11 and 12 are held in traverse expanded state. Seat 20 is held by brake mechanism 31*c* holding gas-spring 31 compressed, whereby all the sections, i.e. front right section 21, front left section 22, rear right section 23 and rear left section 24 are flat as a whole.

In the seating state, the user can put his hips on seat 20, and sit on seat 20 applying his back on seat back 11*f*.

When the user is going to rise from folding wheel chair 10 From this seating state, the user or the carer releases the lock mechanism of operating part 31*e*, and then operates lever 31*e*, so that brake mechanism 31*c* is released. In this situation, when the lock mechanism will be actuated again, brake mechanism 31*c* of gas-spring 31 is held in the released situation even if the user or the carer stops to operate operating part 31*e*.

Next, when the user raises his hips from seat 20 with the strength of his legs or with a support of a carer, the load to seat 20 from the weight of the user are reduced. When this load become lower than the repellent force of gas-spring 31, moving part 31*a* of gas-spring 31 moves downward relatively to body part 31*b*, so that gas-spring 31 is expanded as a whole.

According to the expansion of gas-spring 31, rear right and left sections 23 and 24 of seat 20 are raised upward via linkage 37.

Thereby, rear right and left sections 23 and 24 of seat 20 swing by parallelogram link of link rods 27*a* and 27*b*, and front right and left sections 21 and 22 swing about axis X4 of link rods 27*a* and 27*b*, and front right and left sections 21 and 22 swing about the axis X2, so that the rear right and left sections 23 and 24 are moved up and forward flatly in translational motion.

Simultaneously, front right and left sections 21 and 22 of seat 20 swing about the axis X2 at the front ends and are raised up only at the rear end, since the front ends of front right and left sections 21 and 22 are connected swingably to frame pipes 14*a* and 14*b*. So that front right and left sections 21 and 22 of seat 20 are inclined forward.

Figure 6:
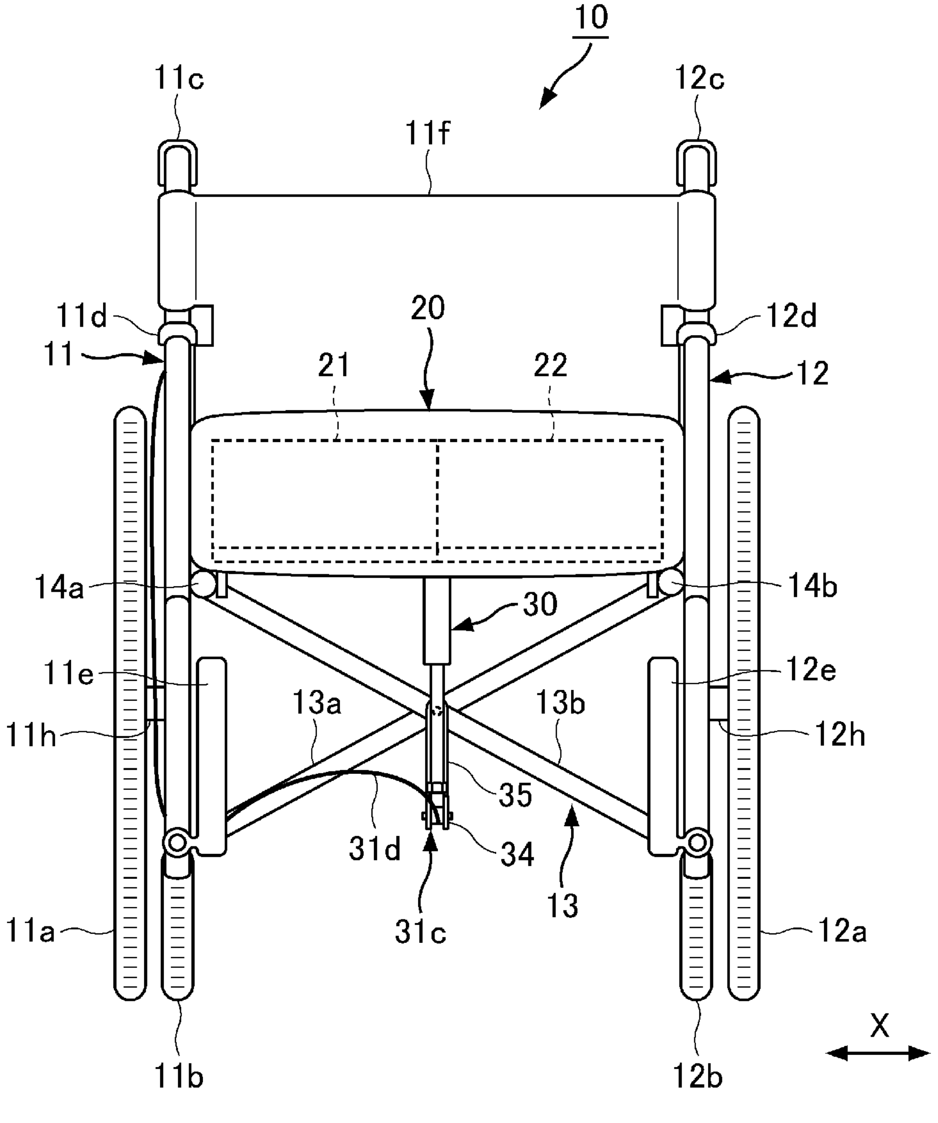
FIG. 6 is a schematic front view of the folding wheel chair of FIG. 1 in the stand-up state.
Figure 7:
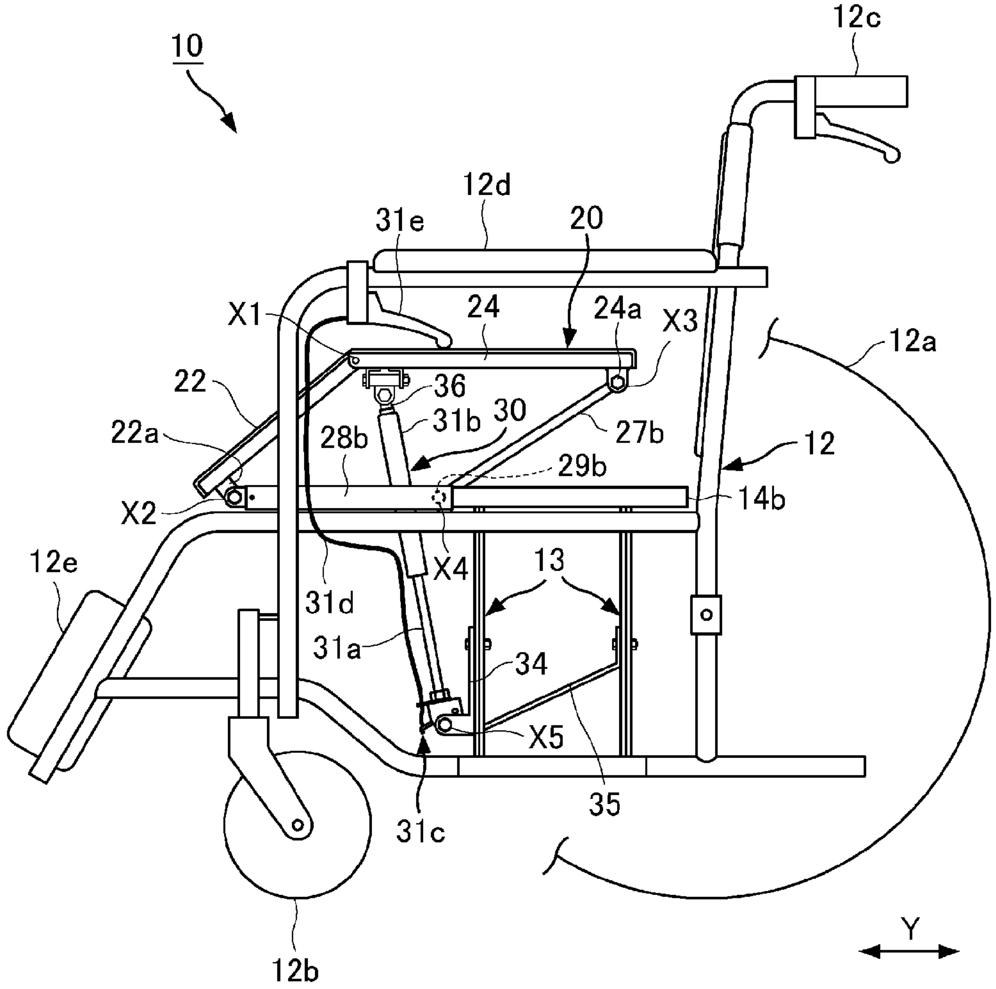
FIG. 7 is a schematic side view of the folding wheel chair shown in FIG. 6.
Figure 8:
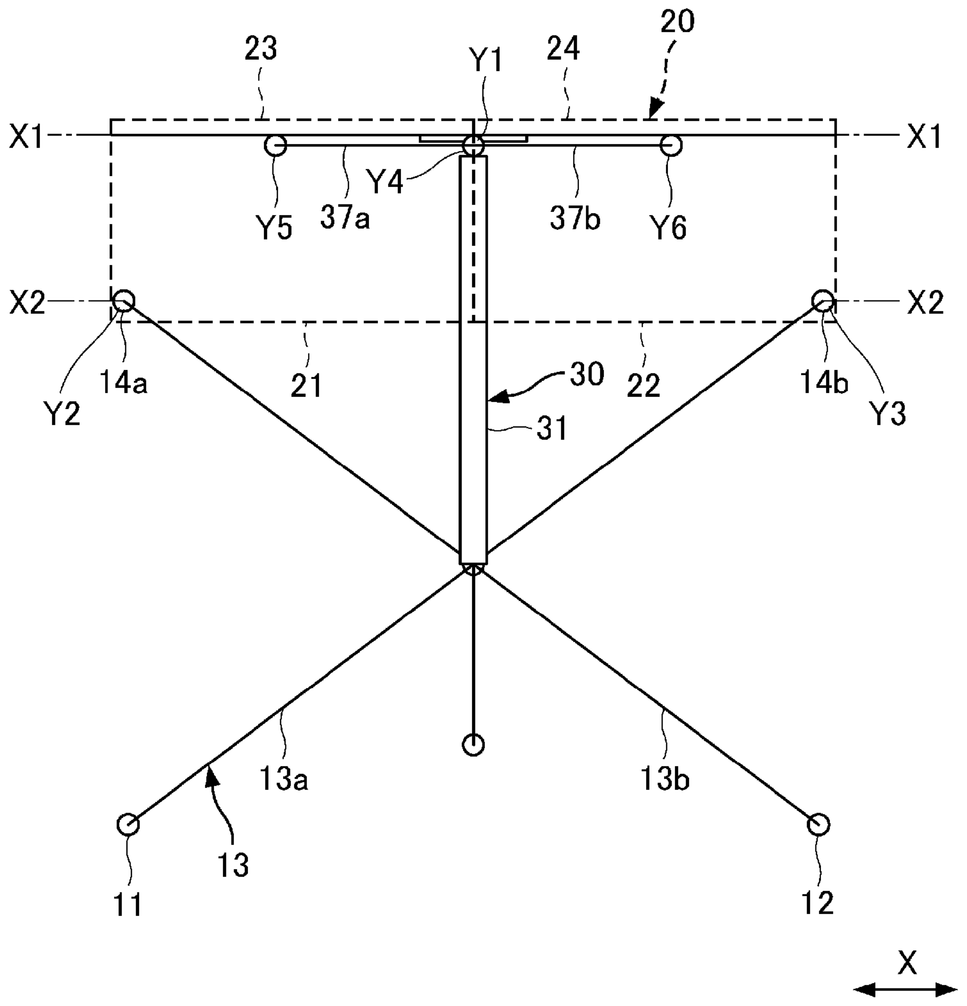
FIG. 8 is a schematic front view in a wireframe of the relation of the seat to the elastic member of the folding wheel chair of FIG. 6.
Figure 9:
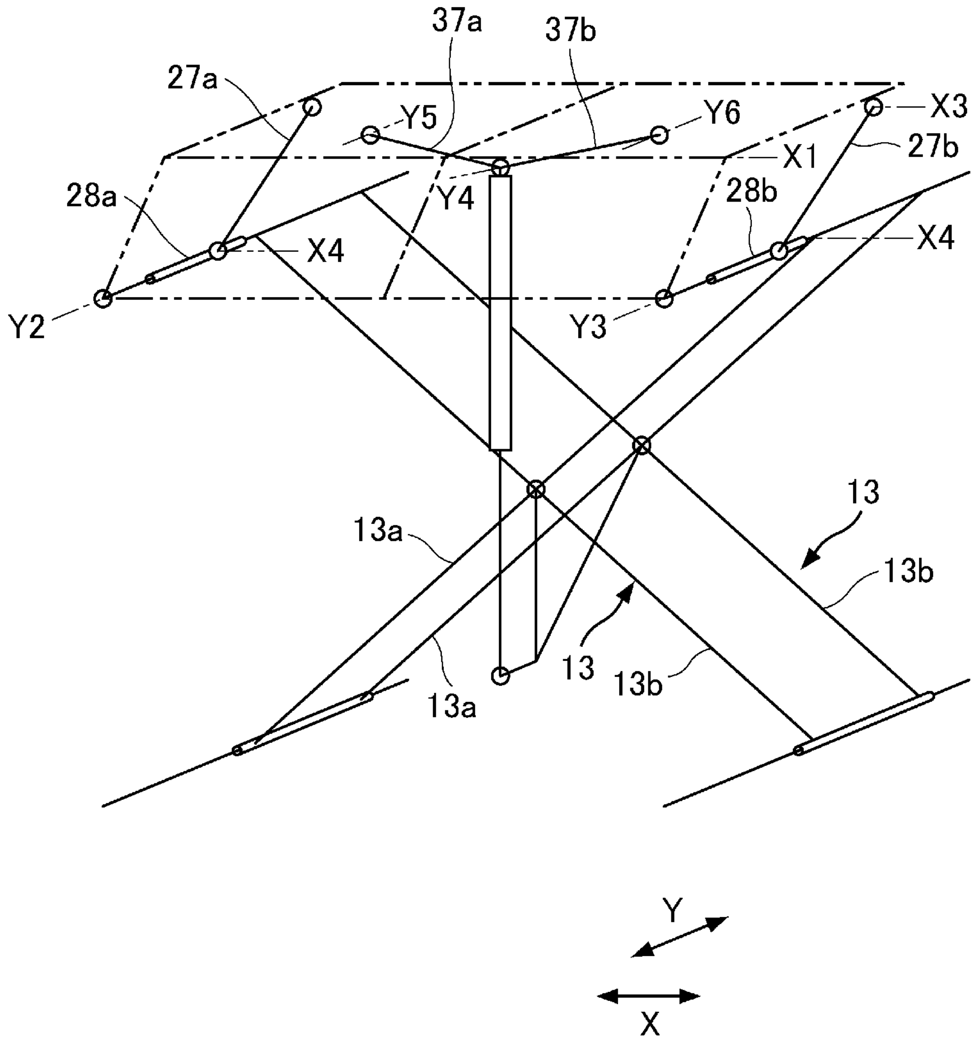
FIG. 9 is a schematic perspective view in a wireframe of the relation of the seat to the elastic member of the folding wheel chair of FIG. 6.

Consequently, folding wheel chair 10 is brought in the stand-up state shown in FIG. 6, FIG. 7 and FIG. 8.

Therefore, when seat 20 is raised up by gas-spring 31, the hips of the user are supported by flat rear right and left sections 23 and 24 of seat 20, and his thighs are supported by forward inclined front right and left sections 21 and 22 of seat 20, so that the user can rise from folding wheel chair 10 stably and easily.

On the contrary, When the user is going to sit on folding foldable wheel chair 10, in the stand-up state as shown in FIG. 6 and FIG. 7, whereby the user stands up in front of folding wheel chair 10, and his thighs are applied to the front of inclined front right and left sections 21 and 22, and then his hips are put on flat rear right and left sections 23 and 24.

From this circumstances, the user or the carer releases the lock mechanism of operating part 31*e* and then operates lever 31*e*, whereby brake mechanism 31*c* of gas-spring 31 is released. In this situation, when the lock mechanism will be actuated again, brake mechanism 31*c* of gas-spring 31 is held in the released situation even if the user or the carer stops to operate operating part 31*e*.

Next, when the user puts his weight on seat 20 by loosening the strength of his legs or with a support of the carer, the load to seat 20 by the weight of the user is increased. Therefore, when this load become greater than the repellent force of gas-spring 31, moving part 31*a* of gas-spring 31 moves upward relatively to body part 31*b*, so that gas-spring 31 is compressed as a whole.

By the compression of gas-spring 31, rear right and left sections 23 and 24 of seat 20 are lowered downward via linkage 37.

Thereby rear right and left sections 23 and 24 of seat 20 swing by the parallelogram link of link rods 27*a* and 27*b* and front right and left sections 21 and 22, i.e. about axis X4 of link rods 27*a* and 27*b*, and front right and left sections 21 and 22 swing about axis X2, so that rear right and left section 23 and 24 are returned back to the seating state flatly in translational motion.

Simultaneously, front right and left sections 21 and 22 of seat 20 swing at the front ends about axis X2 and are lowered down only at the rear end, since the front ends of front right and left sections 21 and 22 are connected swingably to frame pipes 14*a* and 14*b*. So that front right and left sections 21 and 22 of seat 20 come flat.

Consequently, folding wheel chair 10 is brought in the sitting state as shown in FIG. 1 and FIG. 2.

Therefore, when seat 20 is lowered down against the repellent force of gas-spring 31, the hips of the user are supported by the flat rear right and left sections 23 and 24 of seat 20, and his thighs are supported by the forward inclined front right and left sections 21 and 22 of seat 20, so that the user can sit on folding wheel chair 10 stably and easily without sudden falling down.

Figure 5:
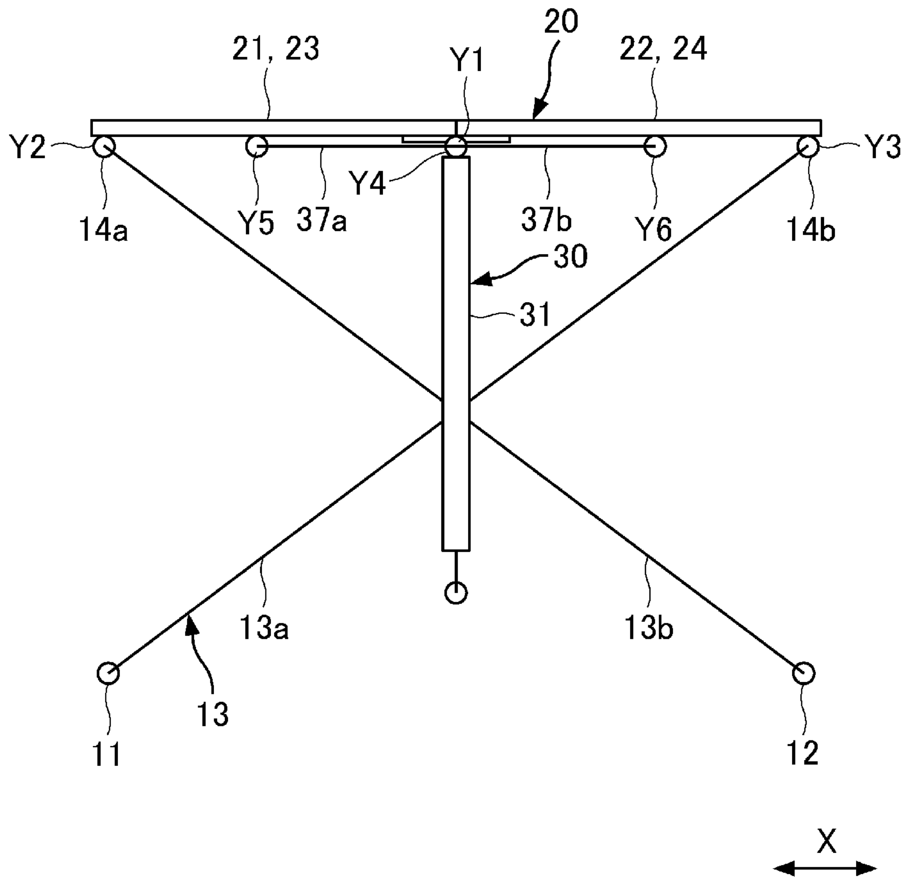
FIG. 5 is a schematic front view in a wireframe of the relation of the seat to the elastic member of the folding wheel chair of FIG. 1.

Furthermore, when the user is going to fold folding foldable wheel chair 10, in the seating state as shown in FIG. 1, FIG. 2 and FIG. 5, the user or the carer manually raises up the front and rear ends of seat 20 at the traverse center and simultaneously push both side frames 11 and 12 to close each other in X direction.

Thereby, front right and rear right sections 21 and 23 and front left and rear left sections 22 and 24 of seat 20 swing about axis Y1, and then form in the reverse-V folded state with a longitudinal peak, whereby front right and rear right sections 21 and 23 and front left and rear left sections 22 and 24 come close to each other in X direction.

At this time, frame pipes 14*a* and 14*b* also come close to each other in X direction, since the right ends of front right section 21 and rear right section 23 are connected to frame pipe 14*a* via rotating member 28*a* and the left ends of front left section 22 and rear left section 24 are connected to frame pipe 14*b* via rotating member 28*b*. Thereby, as to cross links 13, the upper ends of link members 13*a* and 13*b* come close to each other in X direction, and simultaneously the lower ends of link members 13*a* and 13*b* also come close to each other in X direction.

Therefore, cross links 13 are closed, and the distance of both side frames 11 and 12 is reduced, whereby seat back 11*f* is folded.

Figure 10:
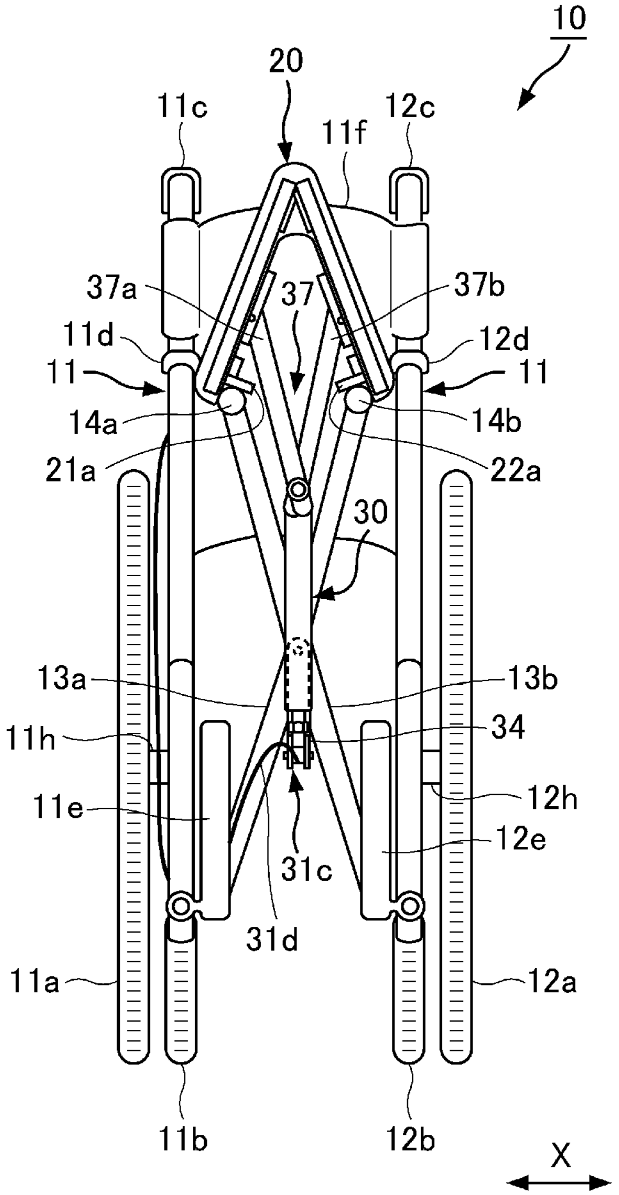
FIG. 10 is a schematic front view of the folding wheel chair of FIG. 1 in the folded state.
Figure 11:
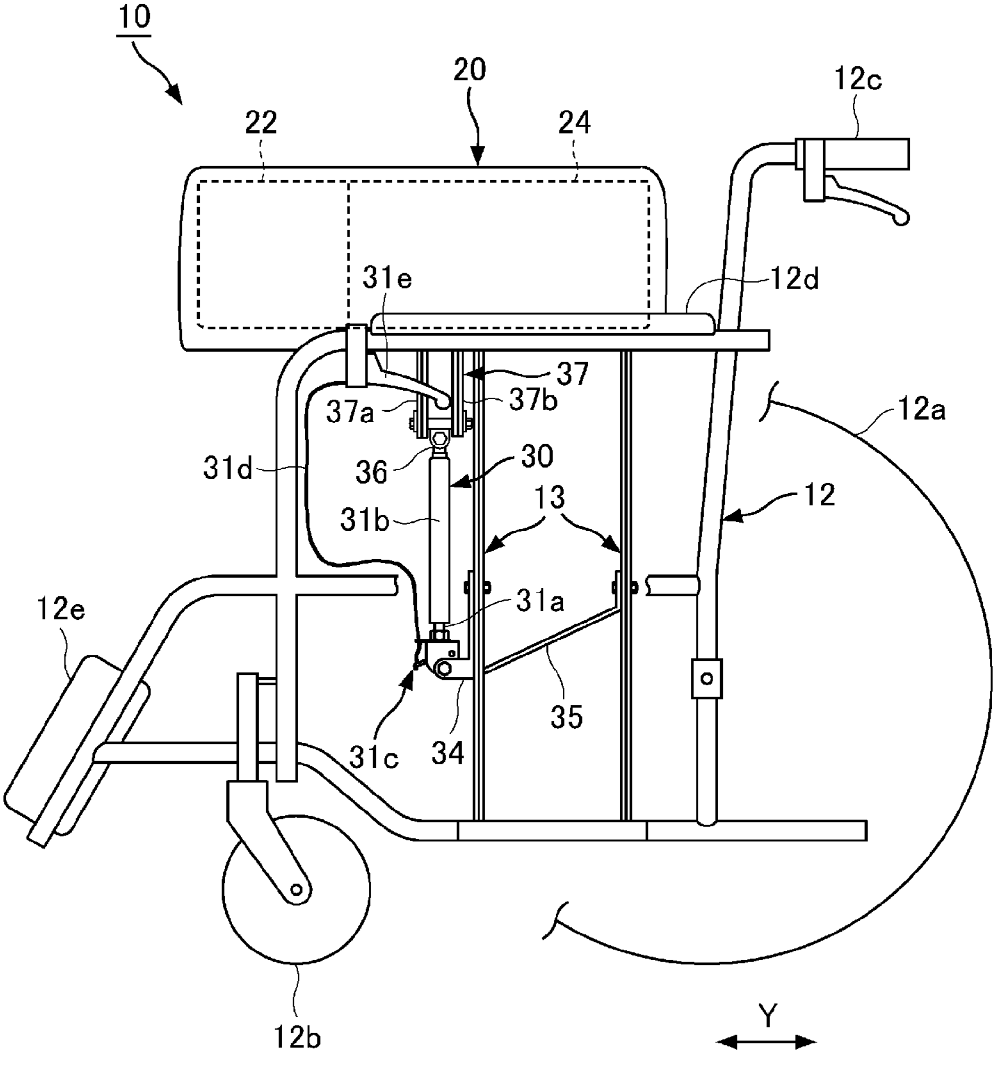
FIG. 11 is a schematic side view of the folding wheel chair shown in FIG. 10.
Figure 12:
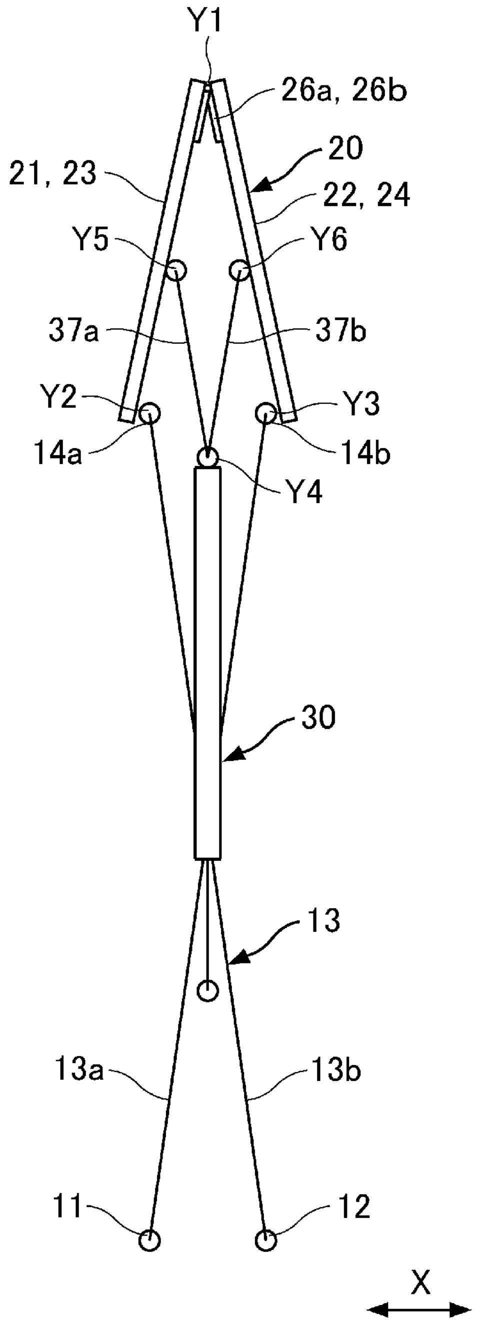
FIG. 12 is a schematic front view in a wireframe of the relation of the seat to the elastic member in the folding wheel chair of FIG. 10.

Thus, folding foldable wheel chair 10 is brought in the folded state as shown in FIG. 10, FIG. 11 and FIG. 12.

During this folding operation, right link member 37*a* and left link member 37*b* of linkage 37 swing about axis Y4, thus transform from the substantially horizontal state to the V-form state.

Thereby, based on the lengths of link member 37*a* and 37*b*, each link member 37*a* and 37*b* swings and each section 21-24 of seat 20 swing to form the reverse-V form having the longitudinal peak, while the position of axis Y4, i.e. the position of upper end 36 of gas-spring 31 is not moved.

Therefore, seat 20 transforms into the folded state, with no restriction by gas-spring 31.

Figure 13:
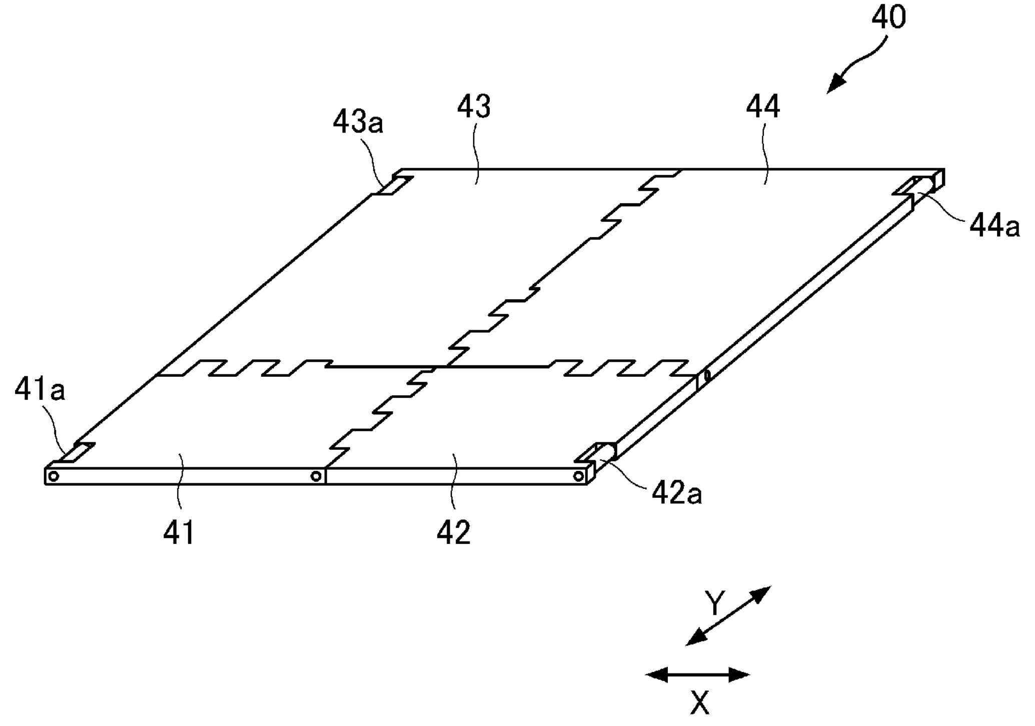
FIG. 13 is a schematic perspective view of a variant of the seat of the folding wheel chair of FIG. 1.
Figure 14:
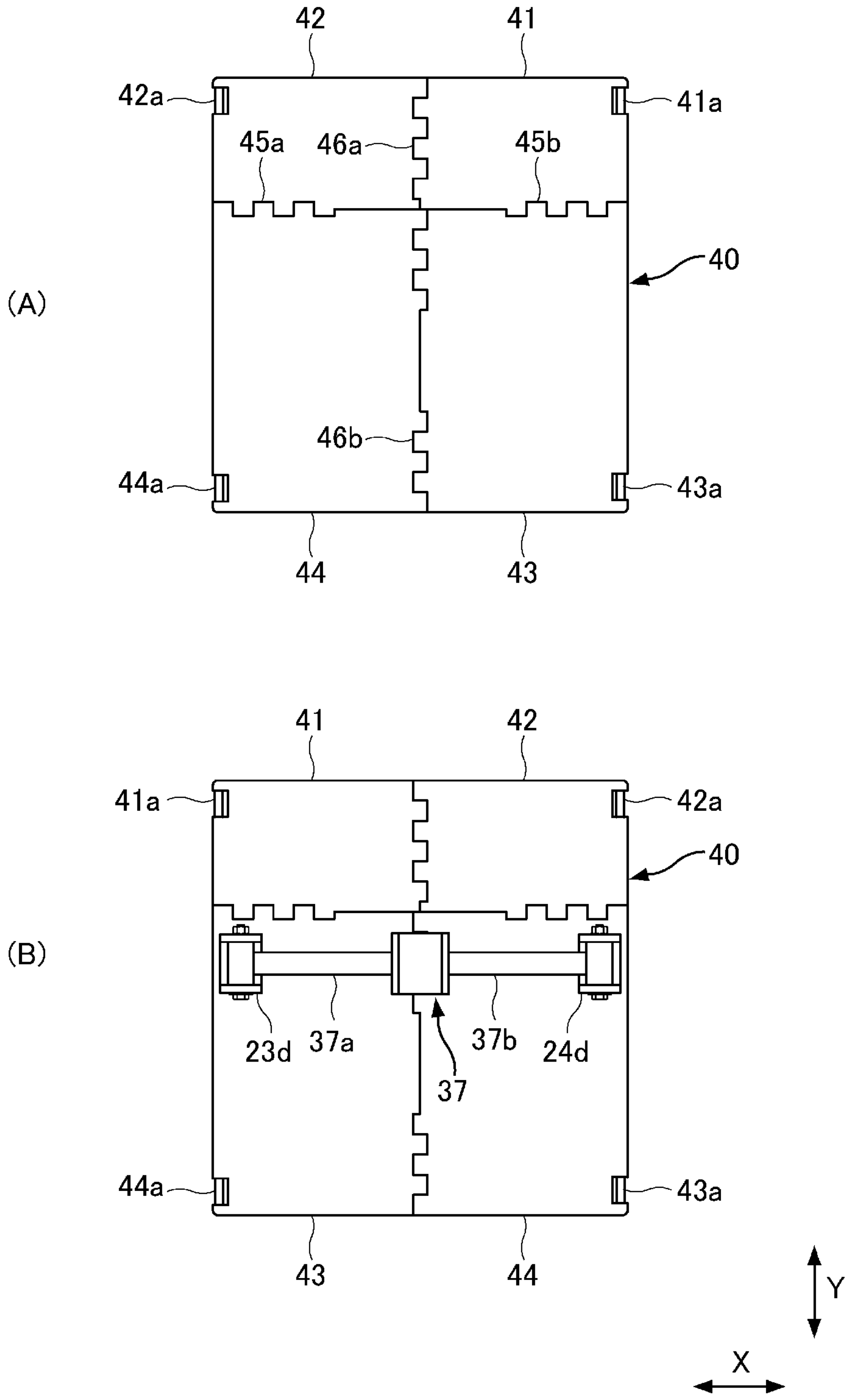
FIG. 14 (A) is a schematic plan views and (B) a schematic bottom view of the seat of FIG. 13.
Figure 15:
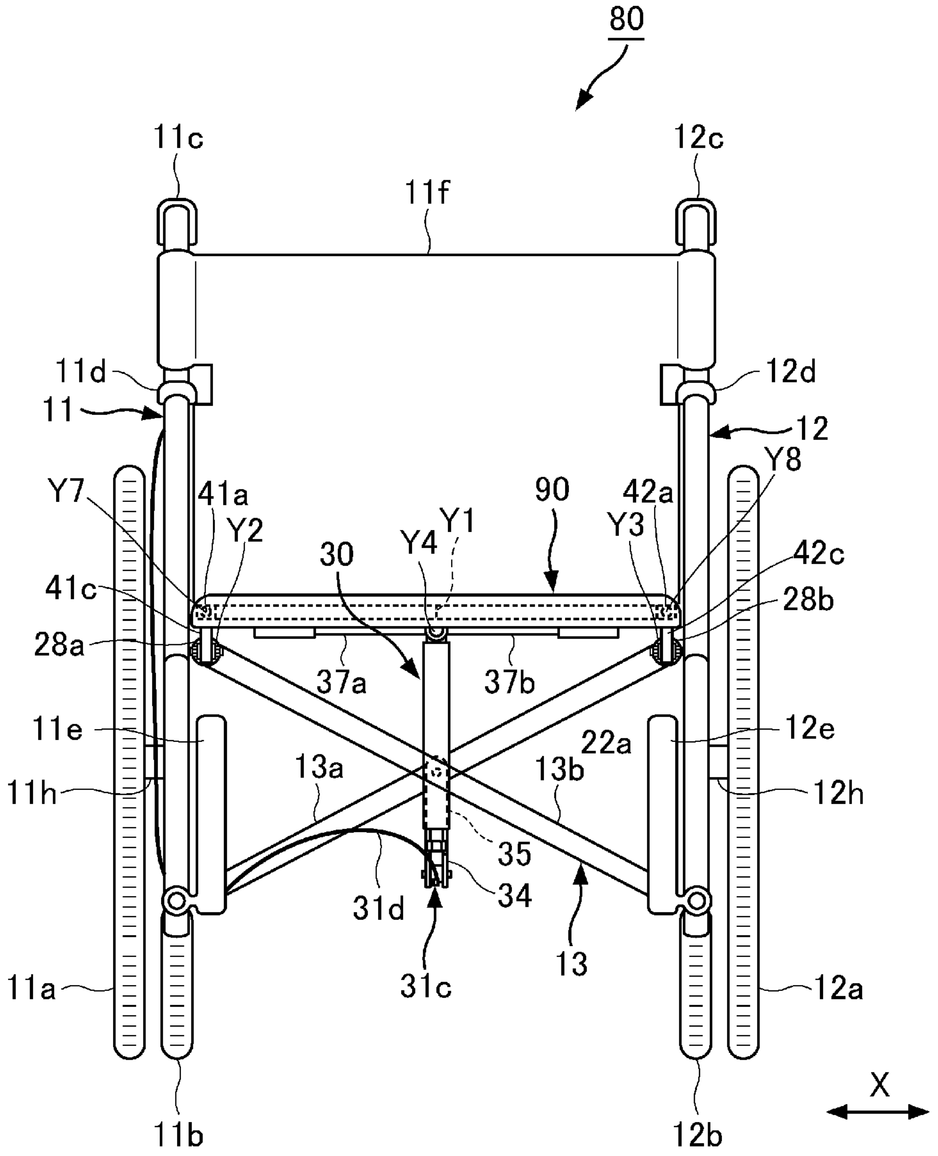
FIG. 15 is a schematic front view of a variant of the folding wheel chair according to the present invention in the seating state.
Figure 16:
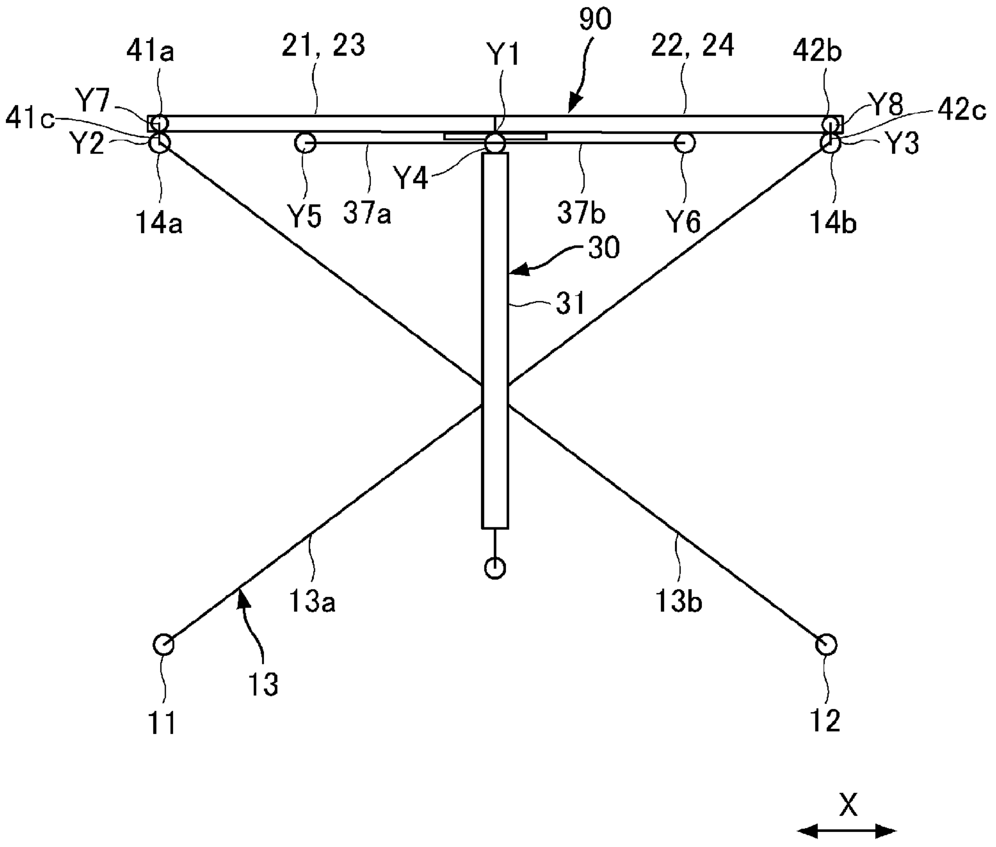
FIG. 16 is a schematic front view in a wireframe of the relation of the seat to the elastic member of the folding wheel chair of FIG. 15.
Figure 17:
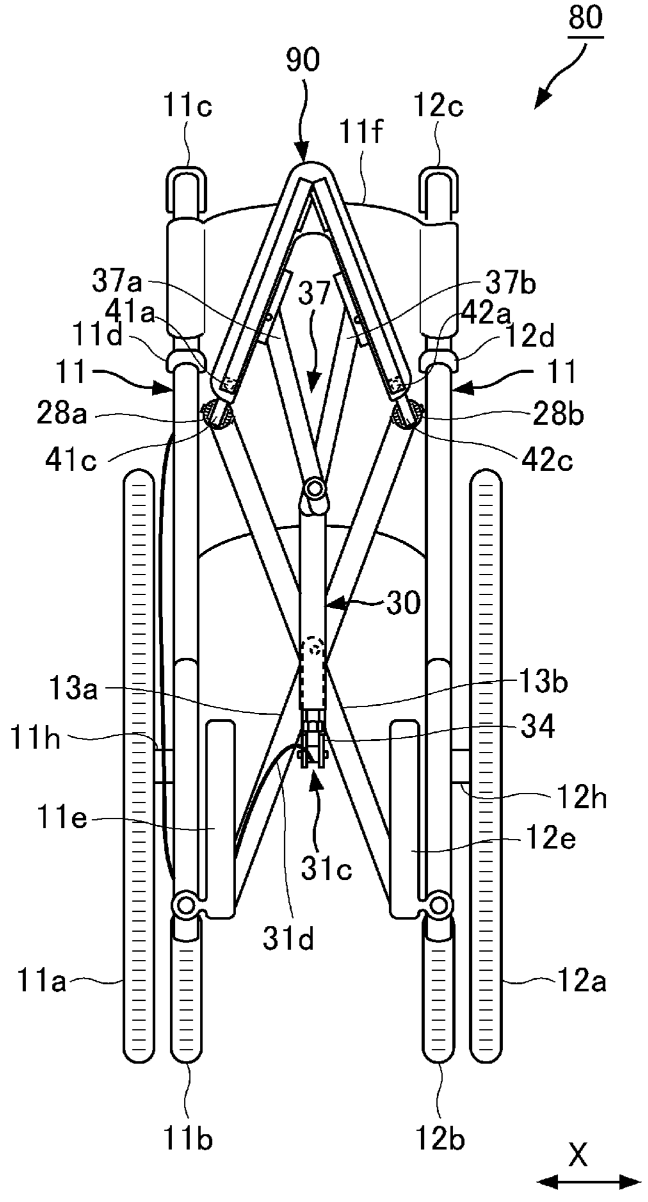
FIG. 17 is a schematic front view of the folding wheel chair of FIG. 15 in the folded state.
Figure 18:
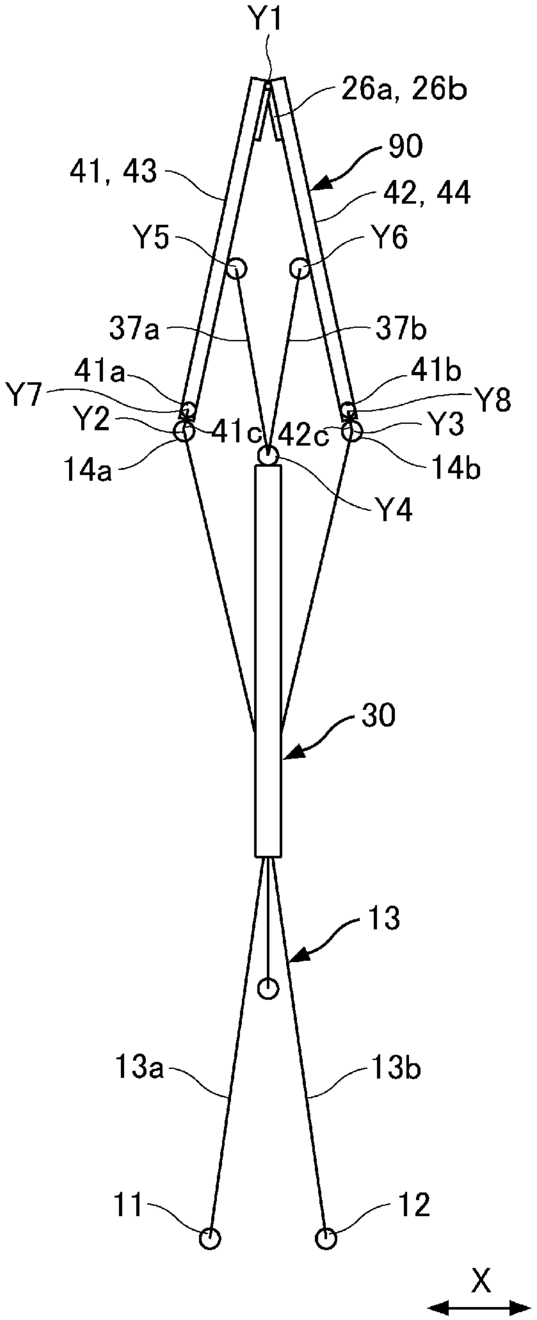
FIG. 18 is a schematic front view in a wireframe of the relation of the seat to the elastic member of the folding wheel chair of FIG. 17.

FIG. 13 and FIG. 14 show a variant of seat 20 in the folding foldable wheel chair of FIG. 1 and FIG. 2.

In FIG. 13 and FIG. 14, seat 40 consists of four sections, i.e. front right section 41, front left section 42, rear right section 43 and rear left section 44, and these are separated respectively along the x-direction and along the longitudinal direction (in y-direction) as seat 20 shown in FIG. 3.

In this case, the boundary edges of sections 41-44 constructing seat 40 have respectively forms mutually engaging in the area corresponding to hinges 25*a*, 25*b*, 26*a* and 26*b* of seat 20, and are constructed swingably about rotating shaft 45*a*, 45*b*, 46*a* and 46*b* integrated inside in engaging state.

Furthermore, each section 41-44 constructing seat 40 is connected to the upper end of spring member 30 respectively via linkage 37, likewise as sections 21-24 of seat 20.

Thus constructed seat 40 acts mostly same as seat 20 shown in FIG. 3, namely rear right and left sections 43 and 44 are raised up and held flatly, and front right and left sections 41 and 42 are inclined forward, whereby seat 40 is brought in the stand-up state, while front right and rear right sections 41 and 43 and front left and rear left sections 42 and 44 are folded in the reverse-V form with a longitudinal peak, whereby seat 40 is brought in the folded state.

Here, in the seating state, each section 41-44 of seat 40 is flat, and there is no straight boundary line between each of section 41-44, so that the user does not feel the boundary line, and so the feeling to sit the folding foldable wheel chair 10 is improved when sitting on seat 40.

As shown in FIG. 13 and FIG. 14, seat 40 is different from seat 20 shown in FIG. 3 in that seat 40 has pipes 41*a* and 42*a*, whereby pipes 41*a* and 42*a* are respectively arranged to extend longitudinally in cutouts formed at front right portion of front right section 41 and front left portion of front left section 42. Furthermore, seat 40 is constructed in areas of rear right and left sections 43 and 44 same as areas of the front right and left sections. Namely, as shown in FIG. 13 and FIG. 14, seat 40 has pipes 43*a* and 44*a*, whereby pipes 43*a* and 44*a* are respectively arranged to extend longitudinally in cutouts formed at the rear right portion of rear right section 43 and the rear left portion of rear left section 44. The effect that such longitudinally extending pipes are arranged in both side ends of seat 40 is mentioned below.

FIG. 15-FIG. 18 show folding foldable wheel chair 80 with a variant of the folding mechanism in folding foldable wheel chair 10 shown in FIG. 1. Here, in folding foldable wheel chair 80, the same components as in folding foldable wheel chair 10 or 40 are given with the same mark as in folding foldable wheel chair 10 or 40, and descriptions thereof are omitted.

seat 90 of folding foldable wheel chair 80 has the same construction as seat 20 of folding foldable wheel chair 10 with regard to the hinge structure about first longitudinal axis Y1.

On the other hand, seat 90 has the same structure as seat 40 with regard to the axis structure at the both side ends. Namely, seat 40 has pipes 41*a* and 42*a*, whereby pipes 41*a* and 42*a* are respectively arranged to extend longitudinally in cutouts formed at the front right portion of front right section 41 and the front left portion of front left section 42. On these pipes 41*a* and 42*a*, respectively bearing members 41*c* and 42*c* are mounted, which are rotatable about pipes 41*a* and 42*a*. That is, each bearing member 41*c* and 42*c* has a bearing part at the upper end, which is formed pipe-like or with C-form in cross-section with an internal diameter greater than the outer diameter of pipes 41*a* and 42*a*, whereby bearing member 41*c* and 42*c* are put on coaxial to pipe 41*a* and 42*a* swingably by the bearing part. Thereby, folding foldable wheel chair 80 has seventh longitudinal axis Y7 and eighth longitudinal axis Y8 between front right section 41, front left section 42 and bearing member 41*c* and 42*c*.

The lower ends of bearing member 41*c* and 42*c* are connected to rotating member 28*a*, 28*b* in the same way as the lower ends of bearing 21*a*, 22*a* in folding foldable wheel chair 10, i.e. are connected swingably to frame pipes 14*a* and 14*b* via second longitudinal axis Y2 and third longitudinal axis Y3.

Furthermore, seat 90 is constructed in areas of rear right and left sections 43 and 44 as areas of the front right and left sections. Namely, as same as seat 40 shown in FIG. 13 and FIG. 14, seat 40 has pipes 43*a*, 44*a*, whereby pipes 43*a*, 44*a* are respectively arranged to extend longitudinally in cutouts formed at the rear right portion of rear right section 43 and the rear left portion of rear left section 44. On these pipes 43*a*, 44*a*, respectively bearing member (not shown) as same as bearing members 41*c* and 42*c* are mounted, which are rotatable about pipes 41*a* and 42*a*. The lower ends of these bearing members are connected respectively to the rear ends of link rods 27*a* and 27*b*, similar to the lower ends of bearing 23*a*, 24*a* in folding wheel chair 10. Thereby, folding wheel chair 80 has seventh longitudinal axis Y7 and eighth longitudinal axis Y8 between rear right section 43, rear left section 44 and the bearing members.

According to the thus constructed folding wheel chair 80, between both side ends of seat 90 and frame pipes 14*a* and

14*b* arranged on the upper ends of cross links 13, there are two longitudinal axes overlapping vertically. Therefore, in folding wheel chair 80, the rotating range of each longitudinal axis is less than in folding wheel chair 10 shown in FIG. 1, and the structural strength is ensured. In front viewing, all of parts defining an angle of each other may be provided with a longitudinal axis i.e. a hinge mechanism, so the width of seat 90 can be more narrowed when folding cross links 13, so that interferences of these parts to other parts are reduced and folding wheel chair 80 can be folded more compact.

Figure 19:
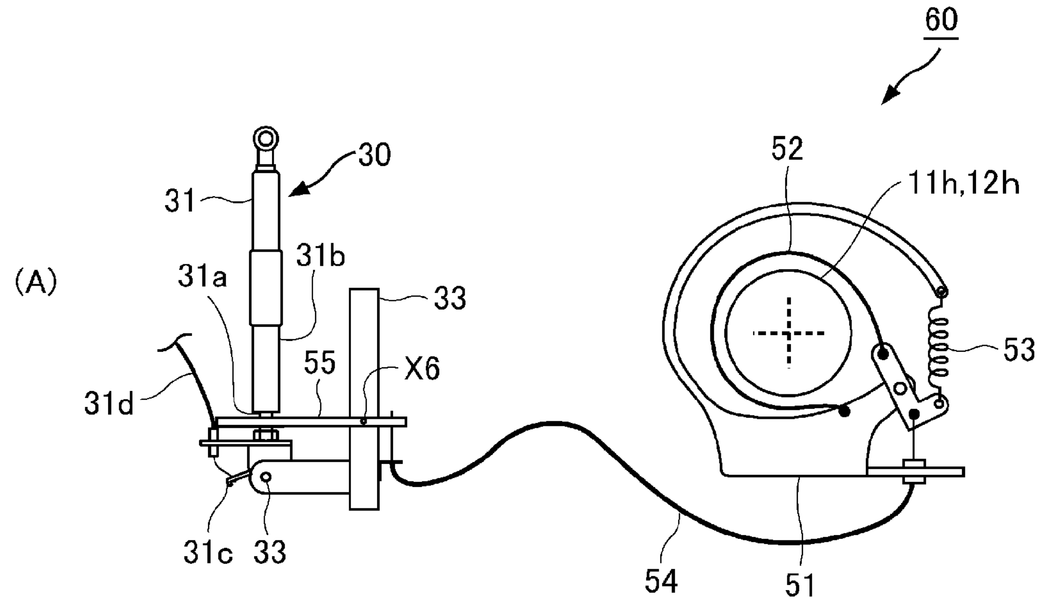
FIG. 19 is partly schematic views showing the brake mechanism added to the folding wheel chair of FIG. 1, (A) is in the seating state and (B) is in the stand-up state.
Figure 19:
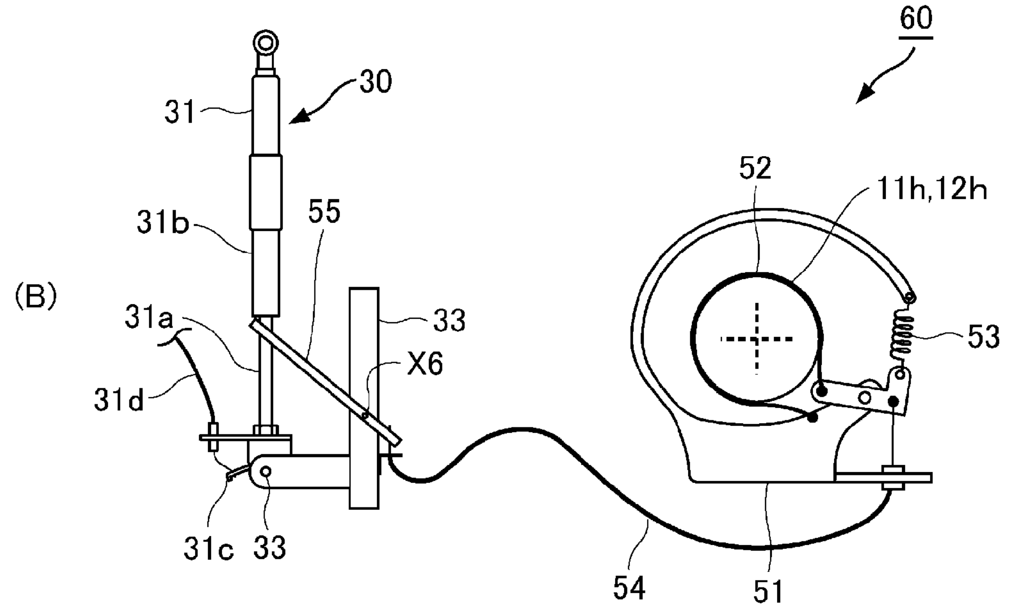

FIG. 19 shows a construction of the brake mechanism added to folding wheel chair 10 of FIG. 1 and FIG. 2.

In FIG. 19(A), brake mechanism 50 consists of a mounting part 51, band brake 52 as a wheel brake, expansion spring 53, brake wire 54 as a transfer mechanism, and brake lever 55, whereby mounting part 51 is arranged under axles 11*h* and 12*h* of wheel 11*a* and 12*a* in folding wheel chair 10, band brake 52 wound in axles 11*h* and 12*h* and at one end fixed to mounting part 51, expansion spring 53 biasing the other end of band brake 52 in the direction to release, brake wire 54 mounted on the other end of band brake 52, brake lever 55 arranged adjacent to gas-spring 31.

As same as above mentioned wire 31*d*, brake wire 54 consists of an outer wire and an inner wire, whereby both ends of the outer wire are fixed respectively to mounting part 51 and mounting member 33. One end of the inner wire is connected to the other end of the band brake.

brake lever 55 is supported to mounting member 33 swingably about the X-direction extending axis X6.

One end of brake lever 55 is connected to the inner wire of brake wire 54, and the other end of brake lever 55 is arranged under the body part 31*b* of gas-spring 31.

According to thus constructed brake mechanism 50, in the seating state shown in FIG. 19(A), gas-spring 31 is compressed, and the other end of brake lever 55 is pushed down by the lower end of body part 31*b* of gas-spring 31. Therefore, the one end of brake lever 55 does not push the inner wire of brake wire 54, so that band brake 52 does not tighten axles 11*h* and 12*h*, thereby axles 11*h* and 12*h* can rotate freely.

From this circumstance, while the user or the carer operates operating part 31*e*, the user stands up. Then the load to seat 20 is lowered, and gas-spring 31 is expanded, and body part 31*b* of gas-spring 31 is raised up. Thereby brake lever 55 is rotated about axis X6, and pushes the inner wire of brake wire 54 as shown in FIG. 19(B).

Thereby, the other end of the inner wire of brake wire 54 pushes the other end of band brake 52 against the repellent force of expansion spring 53, so that band brake 52 tightens axles 11*h* and 12*h*, thus axles 11*h* and 12*h* are prevented to rotate.

In general, in use of a wheel chair, it is ruled to apply a so-called tackle brake (not shown) for preventing rotation of wheels, when the user rises from the wheel chair or the user sits on the wheel chair. However, even if forgetting to apply the tackle brake, brake mechanism 50 prevents rotations of axles 11*h* and 12*h* and wheel 11*a* and 12*a*, whereby the user can rise from and sit on folding wheel chair 10 safely.

In this case, as band brake 52, a band brake can be used which is provided as a so-called hand brake in a conventional wheel chair.

Figure 20:
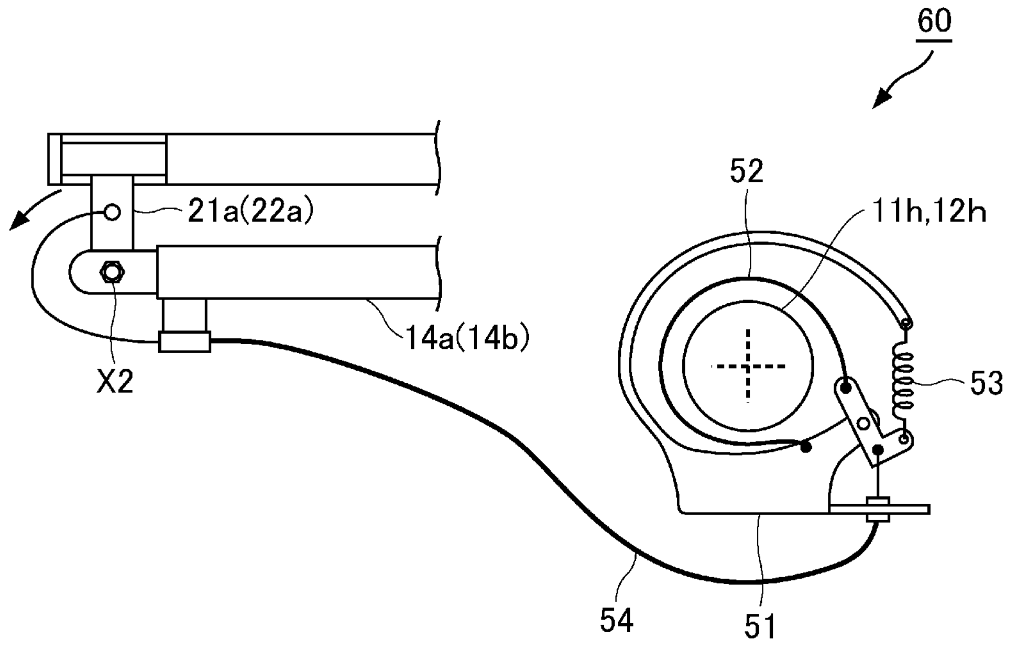
FIG. 20 is a partly side view showing the first variant of the brake mechanism in FIG. 19.

FIG. 20 shows the first variant of brake mechanism shown in FIG. 19.

In FIG. 20, brake mechanism 60 is different from brake mechanism 50 shown in FIG. 19 in that the other end of brake wire 54 is connected to the front edge of front right or left section 21 and 22 of seat 20.

Here, the other end of the outer wire of brake wire 54 is mounted to the area of the front end of frame pipe 14*a* or 14*b* positioned under seat 20. The other end of the inner wire is connected to bearing 21*a* or 22*a* of front right or left section 21 or 22 of seat 20.

According to thus constructed brake mechanism 60, in the seating state shown in FIG. 20, the seat is flat. Therefore, bearing 21*a* or 22*a* of front right or left section 21 or 22 of seat 20 does not push brake wire 54, so that band brake 52 does not tighten axles 11*h* and 12*h*, thereby axles 11*h* and 12*h* can rotate freely.

From this circumstance, while the user or the carer operates operating part 31*e*, the user stands up. Then gas-spring 31 is expanded, and rear right and left sections 23 and 24 of seat 20 are raised up and front right and left sections 21 and 22 of seat 20 are inclined forward by swinging about axis X2, so that according to this swinging the inner wire of brake wire 54 is pushed in.

Thereby, the other end of the inner wire of brake wire 54 pushes the other end of band brake 52 against the repellent force of expansion spring 53, so that band brake 52 tightens axles 11*h* and 12*h*, thus axles 11*h* and 12*h* are prevented to rotate.

Figure 21:
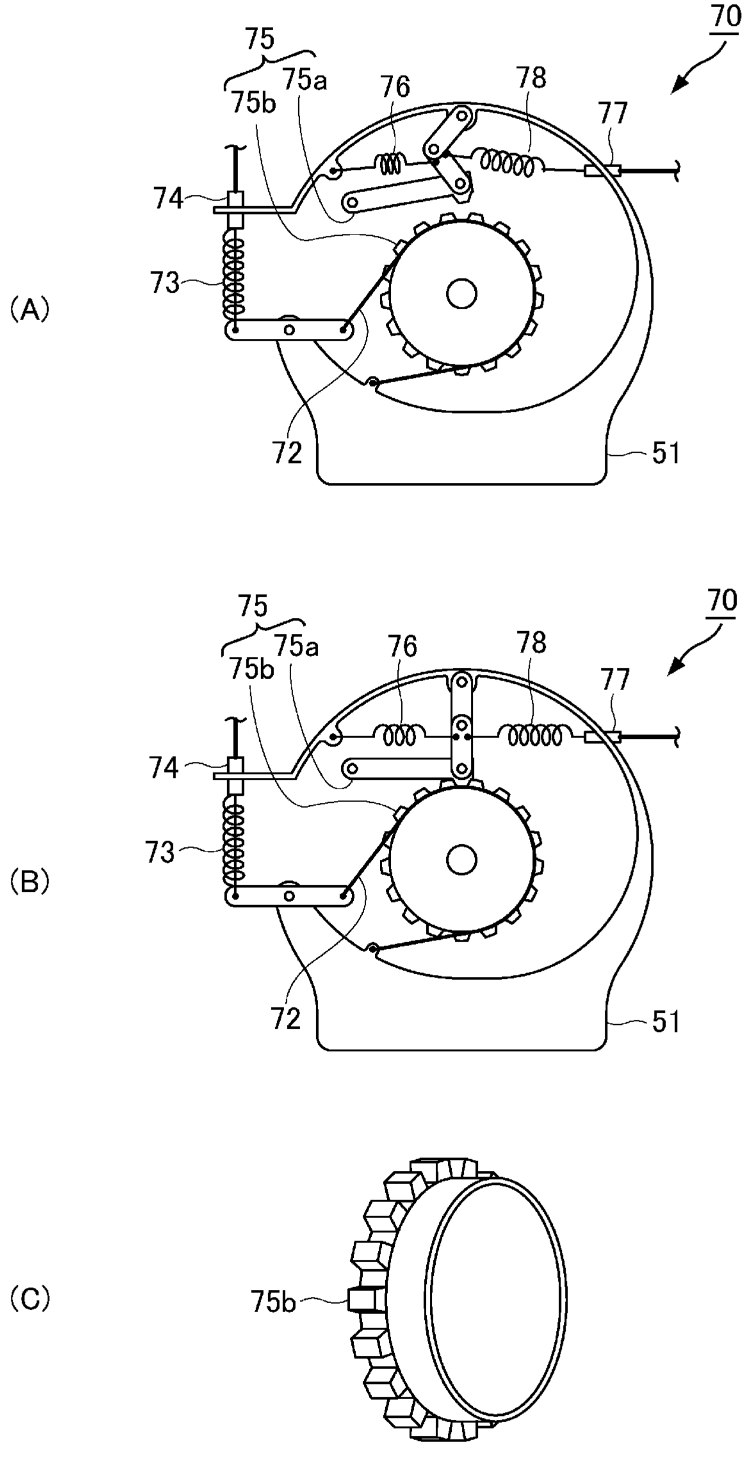
FIG. 21 is a partly side view showing the second variant of the brake mechanism in FIG. 19.

FIG. 21 shows the second variant of brake mechanism shown in FIG. 19.

In FIG. 21, brake mechanism 70 is different from brake mechanism 50 shown in FIG. 19 in that brake structure uses band brake 72 and clutch gear 75. Here, band brake 72 and clutch gear 75 are both arranged around axles 11*h* and 12*h* of wheel 12*a* and 12*b* and brakes wheel 11*a* and 12*a*. clutch gear 75 consists of gear 75*b* shown in FIG. 21(C) and clutch lever 75*a* engaging gear 75*b*.

Here, brake wire 74 with one end connecting to band brake 72 is at the other end connected to brake 12*f* for the carer shown in FIG. 2, whereby wheel 11*a* and 12*a* can be braked, by the carer operating the lever of brake 12*f* against the repellent force of compression spring 73. While brake wire 77 with one end connecting to clutch lever 75*a* of clutch gear 75 is at the other end mounted to the lower end of body part 31*b* of gas-spring 31 as in brake mechanism 50 shown in FIG. 15. Therefore, the user stands up, then as in brake mechanism 50 shown in FIG. 15 the inner wire of brake wire 77 is drawn and presses clutch lever 75*a* to gear 75*b* against the repellent force of expansion spring 76 as shown in FIG. 17(B). Here, an expansion spring 78 has the repellent force greater than expansion spring 76 and less than spring member 30. Therefore, when spring member 30 will move on large scale, expansion spring 78 will expand and absorb the expansion of spring member 30, so define a so-called play. When clutch lever 75*a* is pressed to gear 75*b*, clutch lever 75*a* and gear 75*b* engage each other and lock wheel 12*a* and 12*b*.

According to thus constructed brake mechanism 70, in the seating state shown in FIG. 21 (A), clutch gear 75 does not engage, and thus axles 11*h* and 12*h* can rotate freely unless brake 12*f* for the carer is operated.

From this circumstance, seat 20 is moved in the stand-up state, and then gas-spring 30 is expanded, whereby according to this the inner wire of brake wire 77 is drawn.

Thereby, clutch gear 75 engages, so that axles 11*h* and 12*h* are prevented to rotate. Thus when the user stands up, wheel 11*a* and 12*a* is locked automatically, so that it is prevented that folding wheel chair 10 will move along a slope, etc. unpreparedly.

Thus the folding wheel chair according to the invention can assist safely user's actions of rising from or sitting on the folding wheel chair, in particular an old user, a physically handicapped user, etc. by a simple construction.

Furthermore, as to folding wheel chair 10, using seat 20 consisting of front right and left sections 21 and 22 and rear right and left sections 23 and 24, spring member 30 as an elastic member connected to rear right and left sections 23 and 24 at the upper end, and to cross links 13 at the lower end, or additionally using link rods 27*a* and 27*b* and frame pipes 14*a* and 14*b*, a stand-assist seat can be constructed, and mounted to the conventional folding wheel chair. In this case, a folding wheel chair as same as folding wheel chair 10 can be obtained, just by change the seat portion of the already used folding foldable wheel chair to the above mentioned stand-assist seat.

The present invention can be embodied in various forms in a scope as not to deviate from the idea of the invention. For example, in the above mentioned embodiment, spring member 30 consists of gas-spring 31 and coil spring 32. But without limited by this construction, the spring member may consist of only one of gas-spring 31 or coil spring 32. Also spring member 30 may consist of a spring other than the gas-spring.

In the above mentioned embodiment, in the stand-up state, rear right and left sections 23 and 24 of seat 20 are held in a substantially flat form. But without limited by this construction, these rear right and left sections 23 and 24 may be, in the stand-up state, held in a slightly forward inclined form as the user's hips are held securely on rear right and left sections 23 and 24.

Furthermore, without limited by rotating axis of each portion, more rotating axis can be provided. For example, in front or rear end of the link rods, the connecting portions between the rotating member and rear right and left sections 23 and 24 may respectively be provided with a ball joint.

Furthermore, the operating part of the brake mechanism may be mounted on the operating handle for the carer.

As mentioned above, according to the present invention, by simple construction, a very superior folding wheel chair and a very superior stand-assist seat can be provided.

What is claimed is:

1. A folding wheel chair having a pair of side frames with a pair of wheels, a pair of cross links connecting said side frames each other, and a seat which is foldable by changing the distance between the both side frames, comprising:

- said seat consists of a front right section, a front left section, a rear right section and a rear left section,
- whereby said front right and left sections are connected swingably to front edges of said rear right and left sections respectively via a first transverse axis at the rear edges, and are connected swingably to the front portions of said cross links respectively via a second transverse axis,
- said front right and rear right sections are connected swingably to the right edges of said front left and rear left sections respectively via the first longitudinal axis at the left edges,
- said rear right and left sections are connected to said cross links respectively via an elastic member,
- said seat takes the substantially horizontal seating state when the load to said seat is greater than the repellent force of the elastic member,
- said seat is brought in the stand-up state when said rear right and left sections are lifted up and said front right and left sections are inclined forward when the load to said seat is less than the repellent force of said elastic member.

2. A folding wheel chair as set forth in claim 1, wherein said front right and left sections can swing to said rear right and left sections via said first traverse axis in a range between the same flat state and the reverse-V folded state, and said front right and rear right sections can swing to said front left and rear left sections via said first longitudinal axis in the range between the same flat state and the reverse-V folded state.

3. A folding wheel chair as set forth in claim 1, wherein the rear right portion of said rear right section and the rear left portion of said rear left section are connected respectively to the respective ends of right and left link rods via the third traverse axis, and the other ends of said right and left link rods are connected respectively to said cross links via the fourth traverse axis.

4. A folding foldable wheel as set forth in claim 3, wherein the longitudinal lengths of said right and left link rods are equal to the same of said front right and left sections, and said rear right and left sections are substantially horizontal in the stand-up state.

5. A folding wheel as set forth in claim 3, wherein the other ends of said right and left link rods are connected respectively to said cross links via second and third longitudinal axes.

6. A folding wheel chair as set forth in claim 3, wherein the right end of said rear right section and the left end of said rear left section are connected respectively to said cross links via said second and third longitudinal axes.

7. A folding wheel chair as set forth in claim 1, wherein the lower end of said elastic member is connected to the crossing point of said cross links via the fifth traverse axis.

8. A folding wheel chair as set forth in claim 7, wherein said rear right and left sections are connected respectively to the upper end of said elastic member via a linkage, whereby the distance between the upper end of said elastic member and the crossing point is substantially constant.

9. A folding wheel chair as set forth in claim 7, wherein said linkage have right and left link members, which are connected each other at the lower ends via said fourth longitudinal axis, and connected respectively to said rear right and left sections at the upper ends.

10. A folding wheel chair as set forth in claim 7, wherein said fifth and sixth longitudinal axes are arranged at medium level between said first and fourth longitudinal axes in the folded state.

11. A folding wheel chair as set forth in claim 7, wherein the lengths of said right and left link members are substantially half of the length which is obtained by subtracting the length between said fourth longitudinal axis and the crossing point of said cross links from the sum of length between the first longitudinal axis and the second and third longitudinal axes and the length between the crossing point of said cross links and the second and third longitudinal axes.

12. A folding wheel chair as set forth in claim 7, wherein the lower end of said elastic member is connected to the crossing point of said cross links via a mounting member, which has a vertical slot, in which the lower end of said elastic member is mounted.

13. A folding wheel chair as set forth in claim 1, wherein said elastic member is a compression spring, and the repellent force of said compression spring is set as said seat comes down by the user's weight.

14. A folding wheel chair as set forth in claim 13, wherein said elastic member has guide members which are arranged parallel to an expansion direction of said compression spring and guide an elastic deformation of said compression spring.

15. A folding wheel chair as set forth in claim 13, wherein said guide member has a regulating member, whereby the repellent force of said compression spring can be regulated by adjusting the axial position of said regulating member on said guide member.

16. A folding wheel chair as set worth in claim 1, wherein a wheel brake is provided, which operates to brake the wheels in accordance with the action of said seat to the stand-up state.

17. A folding wheel chair as set forth in claim 16, wherein said wheel brake is connected to said elastic member via a transfer mechanism and operated in accordance with the stretch of said elastic member.

18. A folding wheel chair as set forth in claim 16, wherein said wheel brake is connected to said seat via a transfer mechanism and operated in accordance with the action of said seat to the stand-up state.

19. A folding wheel chair as set forth in claim 16, wherein said wheel brake consists of a lock brake operated to lock the wheels in accordance with the action of said seat to the stand-up state, and a band brake operated to lock the wheels when manually operated by a user or a carer.

20. A stand-assist seat mounted on a folding wheel chair having a pair of side frames with a pair of wheels, and a pair of cross links connecting said side frames each other, comprising:

the seat consisting of a front right section, a front left section, a rear right section and a rear left section, whereby said front right and left sections are connected swingably to front edges of said rear right and left sections respectively via the first transverse axis at the rear edges, and are connected swingably to the front portions of said cross links respectively via a second transverse axis, said front right and rear right sections of said seat being connected swingably to the right edges of said front left and rear left sections respectively via the first longitudinal axis at the left edges, said rear right and left sections are connected to the cross links respectively via an elastic member, said seat takes the substantially horizontal seating state when a load to said seat is greater than the repellent force of the elastic member, said seat is brought in the stand-up state when said rear right and left sections are lifted up and said front right and left sections are inclined forward when the load to said seat is less than the repellent force of said elastic member.

* * * * *